United States Patent
Sharpless et al.

(10) Patent No.: US 7,841,941 B2
(45) Date of Patent: Nov. 30, 2010

(54) EXTENSION COMPONENT FOR AUTHENTICATING GAME DATA

(75) Inventors: Dave Sharpless, Henderson, NV (US); Jamal Benbrahim, Reno, NV (US); Dwayne Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 344 days.

(21) Appl. No.: 11/441,296

(22) Filed: May 24, 2006

(65) Prior Publication Data

US 2007/0287536 A1 Dec. 13, 2007

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................... 463/29; 463/43
(58) Field of Classification Search ................ 463/40, 463/41, 47
See application file for complete search history.

(56) References Cited

U.S. PATENT DOCUMENTS

| | | | |
|---|---|---|---|
| 4,283,709 A | 8/1981 | Lucero et al. | |
| 4,799,635 A * | 1/1989 | Nakagawa | ............. 711/115 |
| 5,114,155 A | 5/1992 | Tillery et al. | |
| 5,357,573 A * | 10/1994 | Walters | ............. 713/193 |
| 5,426,762 A | 6/1995 | Nakagawa | ............. 395/425 |
| 5,643,086 A | 7/1997 | Alcorn et al. | |
| 5,655,961 A | 8/1997 | Acres et al. | |
| 5,707,286 A * | 1/1998 | Carlson | ............. 463/16 |
| 5,770,533 A | 6/1998 | Franchi | |
| 5,788,509 A | 8/1998 | Byers et al. | |
| 5,876,284 A | 3/1999 | Acres et al. | |
| 5,917,725 A | 6/1999 | Thacher et al. | |
| 6,071,190 A | 6/2000 | Weiss et al. | |
| 6,149,522 A | 11/2000 | Alcorn et al. | |
| 6,190,257 B1 * | 2/2001 | Takeda et al. | ............. 463/29 |
| 6,394,905 B1 | 5/2002 | Takeda et al. | ............. 463/29 |
| 6,685,567 B2 | 2/2004 | Cockerille et al. | |

(Continued)

OTHER PUBLICATIONS

Microsoft Press Computer Dictionary, 3rd Edition, copyright 1997, pp. 34,183-184,248,265,315.

(Continued)

*Primary Examiner*—Pierre Eddy Elisca
*Assistant Examiner*—Reginald A Renwick
(74) *Attorney, Agent, or Firm*—Weaver Austin Villeneuve & Sampson LLP

(57) ABSTRACT

Disclosed are methods, apparatus and systems, including computer program products, implementing and using techniques for authenticating data for playing a game of chance on a gaming machine. A motherboard is provided in the gaming machine. A peripheral component is in communication with the motherboard over a bus. The peripheral component has access to authentication code in a memory. An authentication instruction message is received over the bus. Responsive to receiving the authentication instruction message, the authentication code is executed on a processor to perform an authentication process on the data. A signal is output, indicating whether the authentication process is successful in authenticating the data. In one implementation, the signal enables play of the game of chance on the gaming machine when the authentication process is successful, and disables play of the game of chance when the authentication process is unsuccessful.

42 Claims, 15 Drawing Sheets

U.S. PATENT DOCUMENTS

| | | | |
|---|---|---|---|
| 6,839,776 B2 * | 1/2005 | Kaysen | 710/36 |
| 2001/0053712 A1 * | 12/2001 | Yoseloff et al. | 463/1 |
| 2002/0082084 A1 | 6/2002 | Snow et al. | |
| 2003/0120922 A1 * | 6/2003 | Sun et al. | 713/168 |

OTHER PUBLICATIONS

Newtons Telecom Dictionary, Harry Newton, Copyright 1998, pp. 25,279,464,537,782.

International Search Report and Written Opinion dated Jan. 7, 2008 for PCT/US2007/011871.

* cited by examiner

EXTENSION COMPONENT FOR AUTHENTICATING GAME DATA

RELATED APPLICATION DATA

This application is related to co-pending and commonly assigned U.S. patent application Ser. No. 09/338,286 for PROCESSING PLATFORM FOR A GAMING MACHINE, Snow et al., filed on Jun. 22, 1999, which is hereby incorporated by reference in its entirety for all purposes.

BACKGROUND OF THE INVENTION

Gaming machines for playing games of chance include various hardware components. One hardware component often found in gaming machines is a motherboard, also referred to herein as a "board."

FIG. 1 is a block diagram of a conventional gaming machine 100 including a motherboard 105. The motherboard 105 is generally considered the main circuit board of the gaming machine 100, as it includes processor and memory chips enabling game play, connectors for attaching additional boards, mass storage interfaces, serial and parallel ports, expansion slots, and various controllers to control peripheral devices such as a display, player input mechanism, and hard drive or other storage medium.

Motherboards are mass-produced. These mass-produced boards, referred to herein as "off-the-shelf" motherboards, are made by various motherboard manufacturers, and can be purchased from any of a number of suppliers. FIG. 2 is a block diagram of a conventional off-the-shelf motherboard 105 and some of its components. These components include a CPU 205, a memory device such as RAM 210, a chip set 215, and a main BIOS chip 220. The use of off-the-shelf motherboards in gaming machines is desirable because the cost of new boards is reduced, as is the time required to change boards in a gaming machine. One of the reasons the cost is reduced is because a manufacturing assembly line does not need to match specific motherboards with specific BIOS chips or specific firmware releases.

FIG. 3 is a block diagram of a conventional BIOS 300, which can be provided as main BIOS 220 of motherboard 105. The BIOS, or "basic input-output system," is essentially the built-in functionality on the motherboard that determines certain operations of the gaming machine without accessing programs from a storage medium such as a hard disk. For example, the BIOS can contain functions controlling boot-up operations, and controlling various peripheral devices coupled to the motherboard over a bus or other communications interface. The BIOS is often situated in a ROM chip mounted on the motherboard to ensure that the BIOS will generally be available and not be damaged by disk failures.

As mentioned above, one of the primary functions of the BIOS is to enable the gaming machine to be booted upon power-on or reset. In one implementation, the BIOS can be copied from ROM to RAM each time the game is booted. In another implementation, the gaming machine has a flash BIOS, i.e., the BIOS is programmed onto a flash memory chip mounted to the motherboard.

In FIG. 3, the BIOS 300 generally contains three functions, represented as modules in FIG. 3. These modules include "INIT" 305, "Video" 310, and "EXT" 315. The modules 305-315 in BIOS 300 implement boot-up functions when the gaming machine 100 is powered on or reset. The INIT module 305 brings the RAM 210 online, as well as the chip set 215, as shown in FIG. 2. In addition, the INIT module 305 enables access of a bus 230 on the motherboard, as shown in FIG. 2, such as a PCI bus. The video module 310 scans for signatures, and the EXT module 315 implements an extension stage of the boot up functionality. For example, as shown in FIG. 3, the EXT 315 module scans designated memory addresses C000:0 through E000:0 in order to call and test various devices on the motherboard 105 or coupled to the motherboard 105, such as RAM 210. Often, for example, the first card tested during the extension stage is a video card controlling the output of graphical information on a display of the gaming machine, assigned to memory address C000:0. Additional memory addresses scanned during the extension stage provide other functions, such as entering the BIOS set-up stage.

In gaming machines, there is a need to verify that the game data and other contents of a storage medium such as a hard drive or CD is authenticated. The motherboard of the gaming machine is often customized to achieve the desired authentication. The customized motherboard is referred to herein as a "custom motherboard." In FIG. 2, one customization involves customizing the main BIOS chip 220, referred to herein as a "custom main BIOS," to perform the desired authentication. Another common motherboard customization includes mounting a second BIOS chip 225, as shown in FIG. 2, to the board. The second BIOS chip 225 is itself customized to perform part or all of the desired authentication on that gaming machine. Accordingly, the second BIOS chip 225 is referred to herein as a "custom second BIOS." The custom second BIOS alone or in combination with the custom main BIOS perform authentication of software and data, such as audio, video and other media files, received on the gaming machine.

Periodically, advances in motherboard hardware and related software lead to a desire to replace an existing motherboard in the gaming machine with a new motherboard. When the existing motherboard is removed from the gaming machine for replacement, of course all of the components mounted on the existing motherboard are removed with it. The removed components include both the custom main BIOS and any custom second BIOS. The new motherboard has a new main BIOS which needs to be customized in a specific manner to the new motherboard (i.e., often different from the custom main BIOS of the existing board). The new motherboard would also require the engineering and mounting of a new custom second BIOS on the board.

To save cost and time, what is needed is the ability to preserve the authentication processes when swapping motherboards in a gaming machine, for instance, without having to customize the main BIOS or build and mount a custom second BIOS to the new board. In other words, the authentication processes should be enabled regardless of the particular off-the-shelf motherboard inserted in the gaming machine.

SUMMARY OF THE INVENTION

Disclosed are methods, apparatus and systems, including computer program products, implementing and using techniques for authenticating data for playing a game of chance on a gaming machine. A motherboard is provided in the gaming machine. A peripheral component is in communication with the motherboard over a bus. The peripheral component has access to authentication code in a memory. An authentication instruction message is received over the bus. Responsive to receiving the authentication instruction message, the authentication code is executed on a processor to perform an authentication process on the data. A signal is output, indicating whether the authentication process is successful in authenticating the data. In one implementation, the signal enables play of the game of chance on the gaming machine when the authentication process is successful, and disables play of the game of chance when the authentication process is unsuccessful.

All of the foregoing methods and apparatus, along with other methods and apparatus of aspects of the present invention, may be implemented in software, firmware, hardware and combinations thereof. For example, the methods of aspects of the present invention may be implemented by computer programs embodied in machine-readable media and other products.

Aspects of the invention may be implemented by networked gaming machines, game servers and other such devices. These and other features and benefits of aspects of the invention will be described in more detail below with reference to the associated drawings.

DETAILED DESCRIPTION

Figure 1:
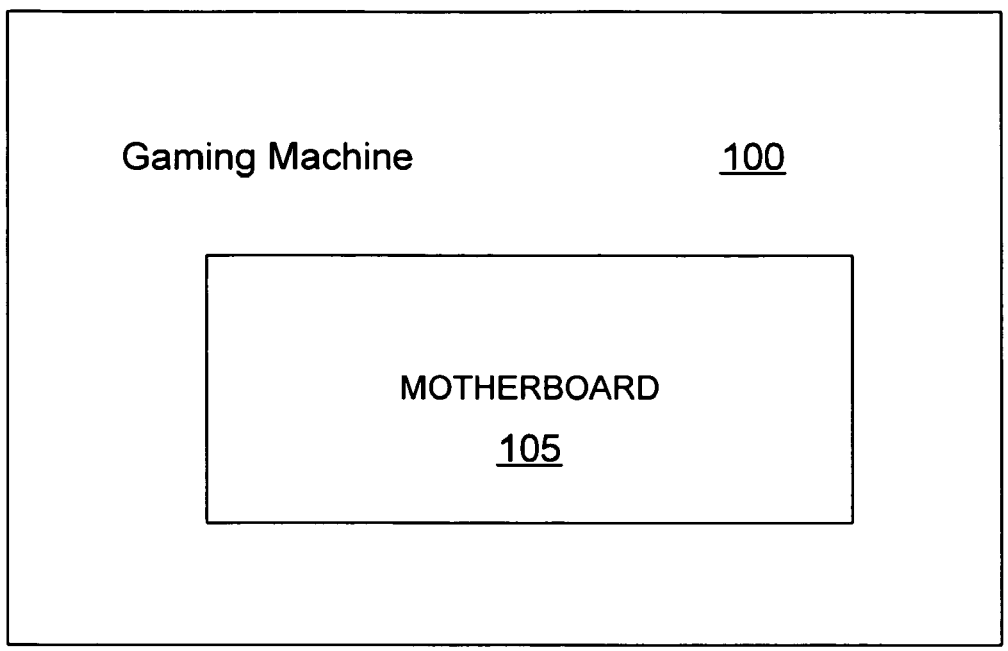
FIG. 1 is a block diagram of a conventional gaming machine 100 including a motherboard 105.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known operations and components have not been described in detail in order not to obscure the present invention.

Embodiments of the present invention provide authentication processes for authenticating game data over a bus, rather than customizing a motherboard in the gaming machine to perform the authentication. In this way, the motherboard can easily be replaced while preserving the authentication processes. The new motherboard does not require customization, e.g., customization of the main BIOS, nor building and mounting a custom second BIOS to the new board.

In one embodiment, the gaming machine includes an off-the-shelf motherboard. A peripheral component is coupled to the motherboard over a bus. Because the peripheral component is coupled to the bus, the peripheral component can be physically located on or off the board. The coupling can include physically inserting the peripheral component into a bus slot or connecting the component to the board via an extension bus like USB, Firewire, PCI, SATA, wireless, or other interface.

In one embodiment, authentication functions are programmed onto the peripheral component. When the gaming machine is booted, the main BIOS runs as normal. During boot-up, the main BIOS will call the peripheral component as a designated device (e.g., PCI). The authentication processes in the peripheral component are then run to authenticate game data. If the authentication fails, the machine can display an appropriate message and reboot or halt the gaming machine operation.

Examples of authentication processes for authenticating data and software in a storage medium (e.g., hard drive), performed according to embodiments of the present invention, are described in Alcorn et al., U.S. Pat. No. 5,643,086, titled ELECTRONIC CASINO GAMING APPARATUS WITH IMPROVED PLAY AND CAPACITY, AUTHENTICATION AND SECURITY, and Alcorn et al., U.S. Pat. No. 6,149,522, titled METHOD OF AUTHENTICATING GAME DATA SETS IN AN ELECTRONIC CASINO GAMING SYSTEM, both of which are hereby incorporated by reference. The authentication code described herein can be constructed so as to execute one or more of the authentication processes described in U.S. Pat. Nos. 5,643,086 and 6,149,522.

In one embodiment, the authentication functions performed by the peripheral component are applied to all of the executable code and graphical resources, i.e., contents of a storage medium such as a hard drive, DVD, CD, EPROM, etc.

In another embodiment, only a designated portion of the storage medium is authenticated, for instance, in a situation where it is desirable to authenticate individual pieces to which control is relinquished through the booting process.

In some embodiments, after the desired contents are authenticated, program flow uses those contents. If the authentication process is unsuccessful, an error message is output, for instance, indicating that the machine should be re-booted or that the card or device implementing the peripheral component should be tested for malfunctions. In conjunction with such testing, it may also be desirable to check whether evidence tape applied to the storage medium has been molested, or other indicators that the machine was tampered with. In one embodiment, when the peripheral component is implemented as a chip, the chip can be pulled out and tested for tampering.

Figure 4:
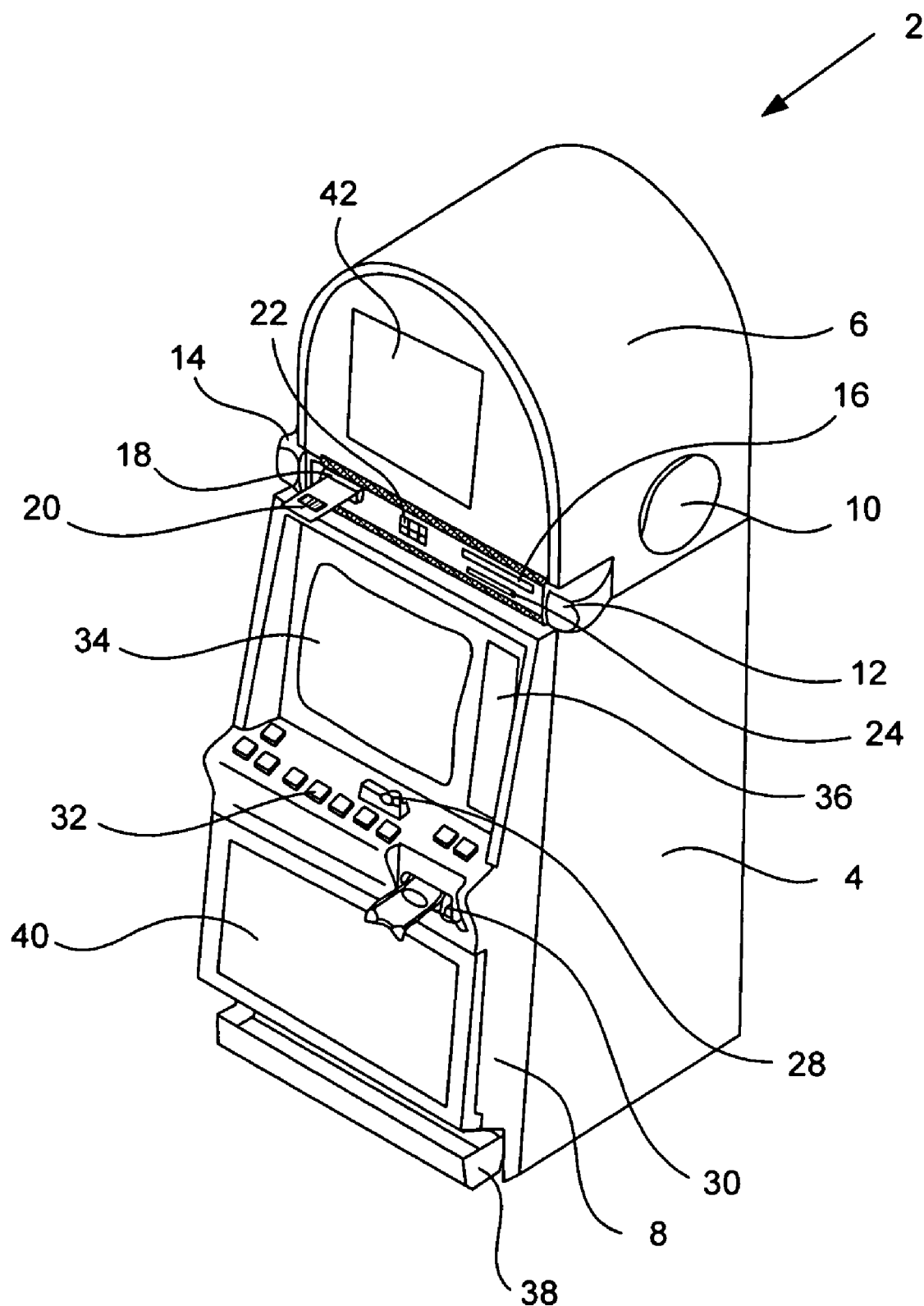
FIG. 4 is a diagram of a video gaming machine 2, constructed according to one embodiment of the present invention.

In FIG. 4, a video gaming machine 2 constructed according to one embodiment of the present invention is shown. Machine 2 includes a main cabinet 4 which generally surrounds the machine interior (not shown) and is viewable by users. The main cabinet includes a main door 8 on the front of the machine that opens to provide access to the interior of the machine. Attached to the main door are player-input switches or buttons 32, a coin acceptor 28, a bill validator 30, a coin tray 38, and a belly glass 40. Viewable through the main door is a video display monitor 34 and an information panel 36. The display monitor 34 is typically a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. a master gaming controller) housed inside the main cabinet 4 of the machine 2.

In FIG. 4, the information panel 36 may be used as an interface to provide player tracking services and other game services to a player playing a game on the gaming machine 2. The information panel 36 may be used as an interface by a player to: 1) input player tracking identification information, 2) view account information and perform account transactions for accounts such as player tracking accounts and bank accounts, 3) receive operating instructions, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms, 9) play games and bonus games, 10) request gaming services such as drink orders, 11) communicate with other players or casino service personnel and 12) register a player for a loyalty program such as a player tracking program. In addition, the information panel 36 may be used as an interface by casino service personnel to: a) access diagnostic menus, b) display player tracking unit status information and gaming machine status information, c) access gaming machine metering information and d) display player status information.

Many different types of games, including mechanical slot games, video slot games, video poker, video black jack, video pachinko and lottery, may be provided on gaming machine 2. The gaming machine 2 is operable to provide play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may execute game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

In FIG. 4, the gaming machine 2 includes a top box 6 which sits on top of the main cabinet 4. The top box 6 houses a number of devices which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. The top box 6 may house various devices. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming devices on which the present invention may be implemented. For example, not all suitable gaming machines have top boxes or player tracking features. Further, some gaming machines have only a single game display—mechanical or video—while others are designed for bar tables and have displays that face upwards. As another example, a game may be generated on a host computer and may be displayed on a remote terminal or a remote gaming device. The remote gaming device may be connected to the host computer via a network of some type such as a local area network, a wide area network, an intranet or the Internet, by a wired or wireless connection. The remote gaming device may be a portable gaming device such as but not limited to a cell phone, a personal digital assistant, and a wireless game player. Images rendered from 3-D gaming environments may be displayed on portable gaming devices that are used to play a game of chance. Further, a gaming machine or server may include gaming logic for commanding a remote gaming device to render an image from a virtual camera in a 3-D gaming environment stored on the remote gaming device and to display the rendered image on a display located on the remote gaming device. Thus, those of skill in the art will understand that the present invention, as described below, can be deployed on most any gaming machine now available or hereafter developed.

Some preferred IGT gaming machines are implemented with special features and/or additional circuitry that differentiates them from general-purpose computers (e.g., desktop personal computers and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements, and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of finds from the gaming machine, such as stolen cash or loss of revenue when the gaming machine is not operating properly.

For the purposes of illustration, a few differences between PC systems and gaming systems will be described. A first difference between gaming machines and common PC based computer systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. This requirement affects the software and hardware design on a gaming machine. As anyone who has used a PC knows, PCs are not state machines and a majority of data is usually lost when such a malfunction occurs.

In one embodiment of the present invention, the gaming machine software defines a state. A state is critical data that contains a state value, critical data modifiers and substates. The state value is an integer value that has meaning to the user of the state. The critical data modifiers are types of critical data that store information about how to modify critical data. Substates are states themselves, but are linked to the state.

The critical data modifiers may be stored and associated with the state using a list. Typically, the critical data modifiers may be grouped to form a list of critical data transactions. A critical data transaction is usually comprised of one or more critical data modifiers. For instance, a critical data transaction to print an award ticket might comprise the operations of 1) start using printer, 2) disable hopper and 3) decrement the credits on the gaming machine by the amount printed to the award ticket where each operation is comprised of one or more critical data modifiers. The list is maintained as critical data to ensure that the items on the list are always valid i.e. the list may not be lost in the event of a power failure or some other gaming machine malfunction. All the transactions in a list for a state are completed or all the transactions are not completed which is a standard transaction technique.

The critical data transactions are a description of how to change critical data. The transactions can be executed by an NV-RAM manager after requests by clients. The list is built until the gaming machine software executes the list by changing the state value which is the mechanism for initiating a transaction. If power is lost to the gaming machine during a transaction, the transaction can be completed due to the design of the state. On power recovery, the gaming machine can determine what state it was in prior to the power failure and then execute the critical data transactions listed in the state until the transactions are completed. For a given state, once the critical data transactions listed in the state are complete, the information describing the critical data transactions comprising the state may be discarded from the non-volatile memory and the gaming machine software may begin execution of the next state.

One feature of the state based transaction system using the non-volatile memory is that the gaming system software may determine when a rollback is required. Once a list of critical data transactions is built as part of the state, the transactions may be executed or rolled back. A rollback occurs when the entire list of critical data transactions is discarded and operations specified in the transactions are not executed. The state-based transaction based system is designed such that it is not possible for only a portion of the list of transactions in a state to be performed i.e. the entire list of transactions in the state may either be rolled back or executed. This feature of the state-based system tends to improve the software reliability and capability because errors due to the partial execution of states do not have to be considered in the software design. It also allows for faster software development.

A second important difference between gaming machines and common PC based computer systems is that for regulation purposes, the software on the gaming machine used to generate the game of chance and operate the gaming machine has been designed to be static and monolithic to prevent cheating by the operator of the gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burned, approved by the gaming jurisdiction and installed on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and in some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally, in the gaming industry, gaming machines have been relatively simple in the sense that the number of peripheral devices and the number of functions of the gaming machine have been limited. Further, in operation, the functionality of gaming machines were relatively constant once the gaming machine was deployed, i.e., new peripheral devices and new gaming software were infrequently added to the gaming machine. This differs from a PC where users will buy different combinations of devices and software from different manufacturers and connect them to a PC to suit their needs depending on a desired application. Therefore, the types of devices connected to a PC may vary greatly from user to user depending on their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators, ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the gaming machine circuitry. These can be generated in a central power supply or locally on the circuit board. If any of these voltages falls out of the tolerance limits of the circuitry they power, unpredictable operation of the gaming machine may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines typically have power supplies with tighter voltage margins than that required by the operating circuitry. In addition, the voltage monitoring circuitry implemented in IGT gaming machines typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This ensures the player's wager and credits are preserved and minimizes potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at just prior to the malfunction including an indication of selections that have already been made by the player. In general, the gaming machine may be restored to any state in a plurality of states that occur in the game of chance while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," all of which are hereby incorporated by reference.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. Some details related to trusted memory devices that may be used in the present invention are described in U.S. Pat. No. 6,685,567 from U.S. patent application Ser. No. 09/925,098, filed Aug. 8, 2001 and titled "Process Verification," which is hereby incorporated by reference.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 4, when a user wishes to play the gaming machine 2, he or she inserts cash through the coin acceptor 28 or bill validator 30. Additionally, the bill validator may accept a printed ticket voucher which may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the information panel 36 and video display screen 42 located in the top box.

During the course of a game, a player may be required to make a number of decisions which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one or more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

An important aspect of the present invention is game software licensing and game license management. When a gaming platform is capable of providing multiple games to a game player based upon a game selection made by the player or an operator, it may be desirable from both an operator perspective and a content provider perspective to provide capabilities for allowing more complex game licensing methods. The operator and content provider may use the licensing capabilities to enter into licensing agreements that better reflect the value of the content (e.g., game software) to each party. For instance, the licensing parties may agree to utility model based licensing schemes, such as a pay-per-use scheme. In a pay-per-use scheme, operators only pay for game software that is utilized by their patrons, protecting them from software titles that are "duds."

Game platforms exist that provide access to multiple electronic games. On these devices, a game selection menu may be provided on a video display, which offers the patron the choice of at least two electronic games. A game player may select a game of their choice from the games available on the gaming machine. Typically, the choices of games available to the player are only those licensed for play on the gaming platform. The gaming platform may provide a manual mechanism, such as a display interface on the gaming machine, for updating and renewing licensing on the gaming machine.

In some game platforms offering multiple games, the games are stored on read-only memory devices, such as an EPROM chip set or a CD-ROM. To provide a new or a different game on a gaming platform of this type, a technician, usually accompanied by a gaming regulator, must manually install a new memory device (e.g. EPROM) and then manually update the licensing configuration on the gaming machine. The gaming regulator then places evidence tape across the EPROM. The evidence tape is used to detect tampering between visits by the gaming regulator. Since operations performed by entities other than a "trusted" $3^{rd}$ party, such as a gaming regulator, have been deemed untrustworthy, automatic game downloads and automatic licensing management is not available on these platforms.

The licensing of multiple games on a gaming machine is described in U.S. Pat. No. 6,264,561, titled "Electronic Gaming Licensing Apparatus and Method," assigned to IGT (Reno, Nev.), which is incorporated herein by reference. In U.S. Pat. No. 6,264,561, multiple games may be stored on an EPROM. Typically, the EPROM may store up to 10 games. The method for getting a license to turn on 3 of 10 games consists of having an operator log onto the gaming machine, select the games to activate and obtain a request code for the selected games that allows them to be activated. Typically, the games are licensed for a limited time period. One disadvantage to this technique lies in the finite capacity of the storage device (EPROM in this case). While 5 or even 10 games can be stored on an EPROM, IGT's library of thousands of games cannot fit. Switching to higher capacity devices such as DVD will postpone the problem somewhat, but this device will be eventually saturated as well.

Other disadvantages are that the games are manually installed and activated. Thus, any changes or upgrades to the software on the gaming machine, such as adding a new game or fixing software on any of the games on the storage device involves replacing the entire storage device. As the number of games on the storage devices is increased and more games are made available on gaming platforms, it is likely that more frequent configuration changes on the gaming platform will be desired. As the number of configuration changes increases, it becomes more desirable to automate the configuration and licensing process.

One method to avoid swapping of the physical DVD, EPROM, etc., devices that store the game programs is to electronically download the necessary software into the gaming machine. Software download also allows a gaming machine to access scalable server farms and databases to select a set of games it needs from the game library. A desire of casino operators after games are safely downloaded is the ability to electronically move the games around on the casino floor. Casino managers routinely move slot machines (entire slot machine) around the floor in search of the optimum layout. A popular new game might be located near the door, but an older game might be better suited in the back. A Harley-Davidson™ game might be moved to the front during a biker convention, etc. Casinos often protect the arrangement of slot games as trade secrets. The laborious and costly casino floor rearrangement process needs to be expedited. When games can be electronically downloaded, they may also be electronically moved around the casino floor.

When a choice of games is offered, it complicates their distribution in part because every customer (purchaser of game software) may choose to license a unique combination of games. For example, one may choose Blackjack, Poker, and Keno while another chooses Poker, Twenty One, and Wheel of Fortune. One means to provide this would be to create a custom configuration of game software as requested by each customer. But, this "binary packaging" can be difficult and time consuming to manage especially in an envisioned environment where hundreds of new games may be introduced each year and distributed to thousands of slot machines on a typical casino floor. Another method of game licensing is to distribute all games to every customer and use an encryption technique that allows customers to 'unlock' only the games they are willing to buy, and install them only on the number of machines for which they have licenses. As described above, the activation is performed manually at the gaming machine. It is anticipated that it will be difficult to manage manually a game inventory mix in an environment where hundreds of new game titles may surface each year.

Manual activation schemes enforced with encryption present problems. Managers often change the selection and mix of games found in a given area of the casino because it can dramatically affect the amount of play and revenue. From the viewpoint of gaming operators, the overhead associated with manually activating encrypted games each time a game is added, deleted or transferred is a deterrent to providing gaming platform with multiple games. In addition, once the 'key' has been given to 'unlock' a particular game on one machine, it may be difficult to then revoke a key residing on a stand-alone machine. In a stand-alone machine, an operator must manually access the interior of the gaming machine and install software that revokes the key. Without the ability to 'lock' games once they have been 'unlocked,' multiple, unauthorized copies could operate simultaneously.

It is unacceptable to game content providers and gaming regulators to allow the use of unauthorized and untracked software on gaming platforms. To be properly compensated, game content providers want to know where and how much their software is being used. To ensure fairness, gaming regulators need to be able show that game software residing on a gaming machine is authentic and approved game software from an authorized content provider. In light of the above, methods that automate the game changeover process on gaming machine while providing an accurate record of the software transactions for auditing purposes and for use in utility licensing models are desirable.

In the past, a game license has been associated with the game software and the physical gaming machine that runs it.

For example, the license may have been tied to a particular CPU or microprocessor on the gaming machine. In future gaming systems with gaming machines that are download enabled and contain multiple cells or cores that are capable of running multiple "virtual machines," it is anticipated that the game software and its license may no longer be associated with the gaming machine on which it is executed. In this environment, the game software may be allowed to "float" between various gaming devices and the physical device where the game software is executed becomes less relevant. For example, a casino floor could have 3000 gaming machines/game servers with the capability of generating 10,000 games of chance simultaneously where each gaming machine has the ability to remotely generate a game outcome on the other gaming machines or download game software to the other gaming machines. For the purposes of licensing, each instantiation of a game of chance may be viewed as a "virtual" gaming machine where each "virtual" gaming machine may be licensed individually. Thus, a license management system and methods are needed to manage game licenses for the 10,000 virtual gaming machines in a manner that meets the requirements of game regulators, casino operators, gaming machine manufacturers and game software content providers.

To implement gaming downloads for operator configuration purposes as well as game-on-demand for game players, the concerns and issues of many gaming interests, such as game players, casino operators, gaming regulators and game software providers, must be considered. The concerns and issues may include but are not limited to licensing requirements, regulatory requirements, network reliability and download time. Details of apparatus and methods designed to address these concerns are described with respect to the following figures.

Figure 5:
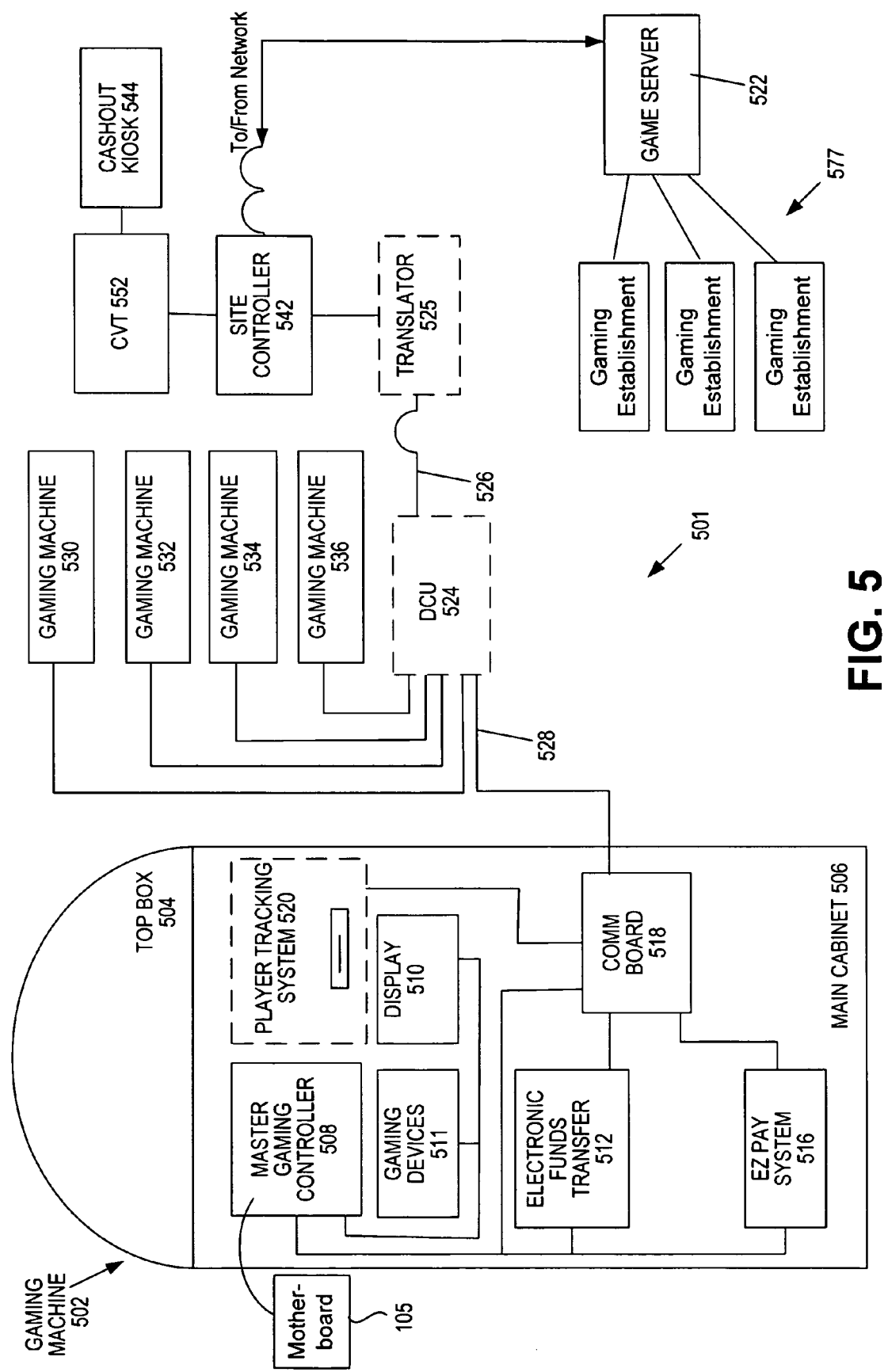
FIG. 5 is a block diagram of a gaming system that may be used to implement one or more embodiments of the invention.

A gaming system 577 that may be used to implement embodiments of the invention, is depicted in FIG. 5. Components of the gaming system 577 can be situated in one or more gaming establishments. A gaming establishment 501 could be any sort of gaming establishment, such as a casino, a card room, an airport, a store, etc. In this example, gaming system 577 is illustrated as being associated with more than one gaming establishment, all of which are networked to game server 522.

Here, gaming machine 502, and the other gaming machines 530, 532, 534, and 536, include a main cabinet 506 and a top box 504. The main cabinet 506 houses the main gaming elements and can also house peripheral systems, such as those that utilize dedicated gaming networks. The top box 504 may also be used to house these peripheral systems.

Figure 2:
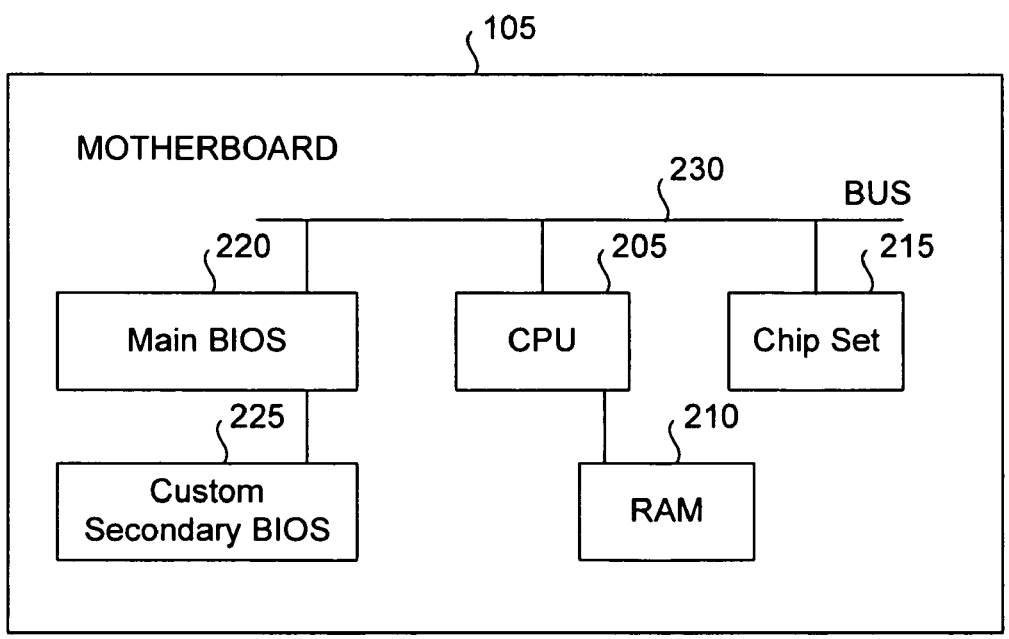
FIG. 2 is a block diagram of a conventional off-the-shelf motherboard 105 including motherboard components.
Figure 3:
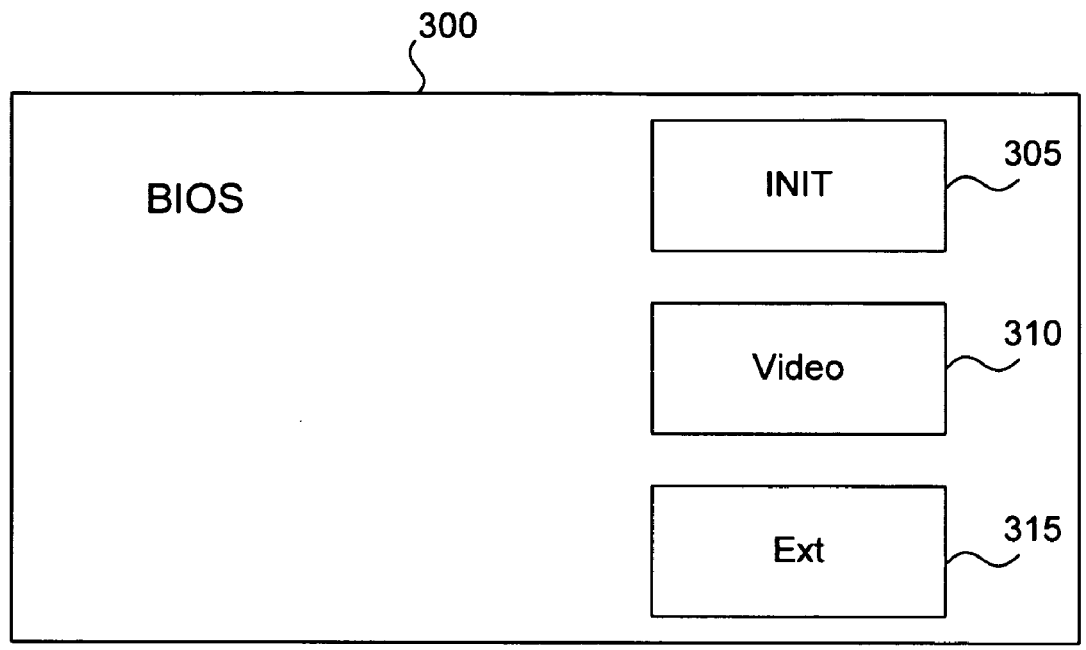
FIG. 3 is a block diagram of a conventional BIOS 300 of motherboard 105.
Figure 3:
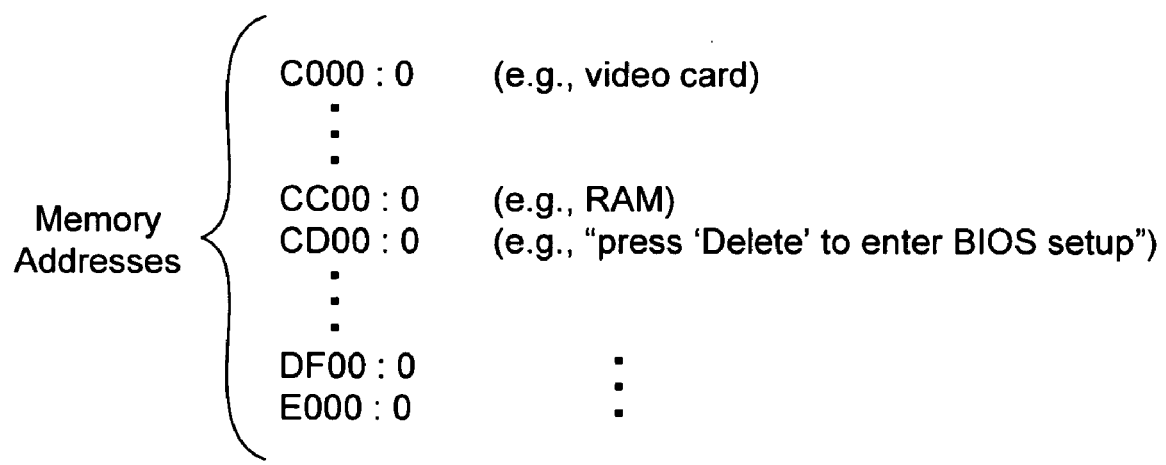

The master gaming controller 508 controls the game play on the gaming machine 502 according to instructions and/or game data from game server 522 or stored within gaming machine 502 and receives or sends data to various input/output devices 511 on the gaming machine 502. The master gaming controller 508 may also communicate with a display 510. In one embodiment, master gaming controller 508 includes processor(s) and other apparatus of the gaming machines described above in FIG. 4. One or more of these processors, such as CPU 205, memory 210, and other apparatus, as shown in FIG. 2, can be situated on motherboard 105 within master gaming controller. Those skilled in the art should appreciate that certain components of the motherboard 105 can have different functions from those of master gaming controller 508. The implementation of motherboard 105 within master gaming controller 508 is but one embodiment of the present invention.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 508 may also communicate with EFT system 512, EZPay™ system 516 (a proprietary cashless ticketing system of IGT), and player tracking system 520. The systems of the gaming machine 502 communicate the data onto the network 528 via a communication board 518.

It will be appreciated by those of skill in the art that embodiments of the present invention could be implemented on a network with more or fewer elements than are depicted in FIG. 5. For example, player tracking system 520 is not a necessary feature of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment.

Moreover, DCU 524 and translator 525 are not required for all gaming establishments 501. However, due to the sensitive nature of much of the information on a gaming network (e.g., electronic find transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 542 provides this function for gaming establishment 501. Site controller 542 is connected to a central system and/or other gaming establishments via one or more networks, which may be public or private networks. Among other things, site controller 542 communicates with game server 522 to obtain game data, such as ball drop data, bingo card data, etc.

In the present illustration, gaming machines 502, 530, 532, 534 and 536 are connected to a dedicated gaming network 528. In general, the DCU 524 functions as an intermediary between the different gaming machines on the network 528 and the site controller 542. In general, the DCU 524 receives data transmitted from the gaming machines and sends the data to the site controller 542 over a transmission path 526. In some instances, when the hardware interface used by the gaming machine is not compatible with site controller 542, a translator 525 may be used to convert serial data from the DCU 524 to a format accepted by site controller 542. The translator may provide this conversion service to a plurality of DCUs.

Further, in some dedicated gaming networks, the DCU 524 can receive data transmitted from site controller 542 for communication to the gaming machines on the gaming network. The received data may be, for example, communicated synchronously to the gaming machines on the gaming network.

Here, CVT 552 provides cashless and cashout gaming services to the gaming machines in gaming establishment 501. Broadly speaking, CVT 552 authorizes and validates cashless gaming machine instruments (also referred to herein as "tickets" or "vouchers"), including but not limited to tickets for causing a gaming machine to display a game result and cash-out tickets. Moreover, CVT 552 authorizes the exchange of a cashout ticket for cash. These processes will be described in detail below. In one example, when a player attempts to redeem a cash-out ticket for cash at cashout kiosk 544, cash-out kiosk 544 reads validation data from the cashout ticket and transmits the validation data to CVT 552 for validation. The tickets may be printed by gaming machines, by cashout kiosk 544, by a stand-alone printer, by CVT 552, etc. Some gaming establishments will not have a cashout kiosk 544. Instead, a cashout ticket could be redeemed for cash by a cashier (e.g. of a convenience store), by a gaming machine or by a specially configured CVT.

Figure 6:
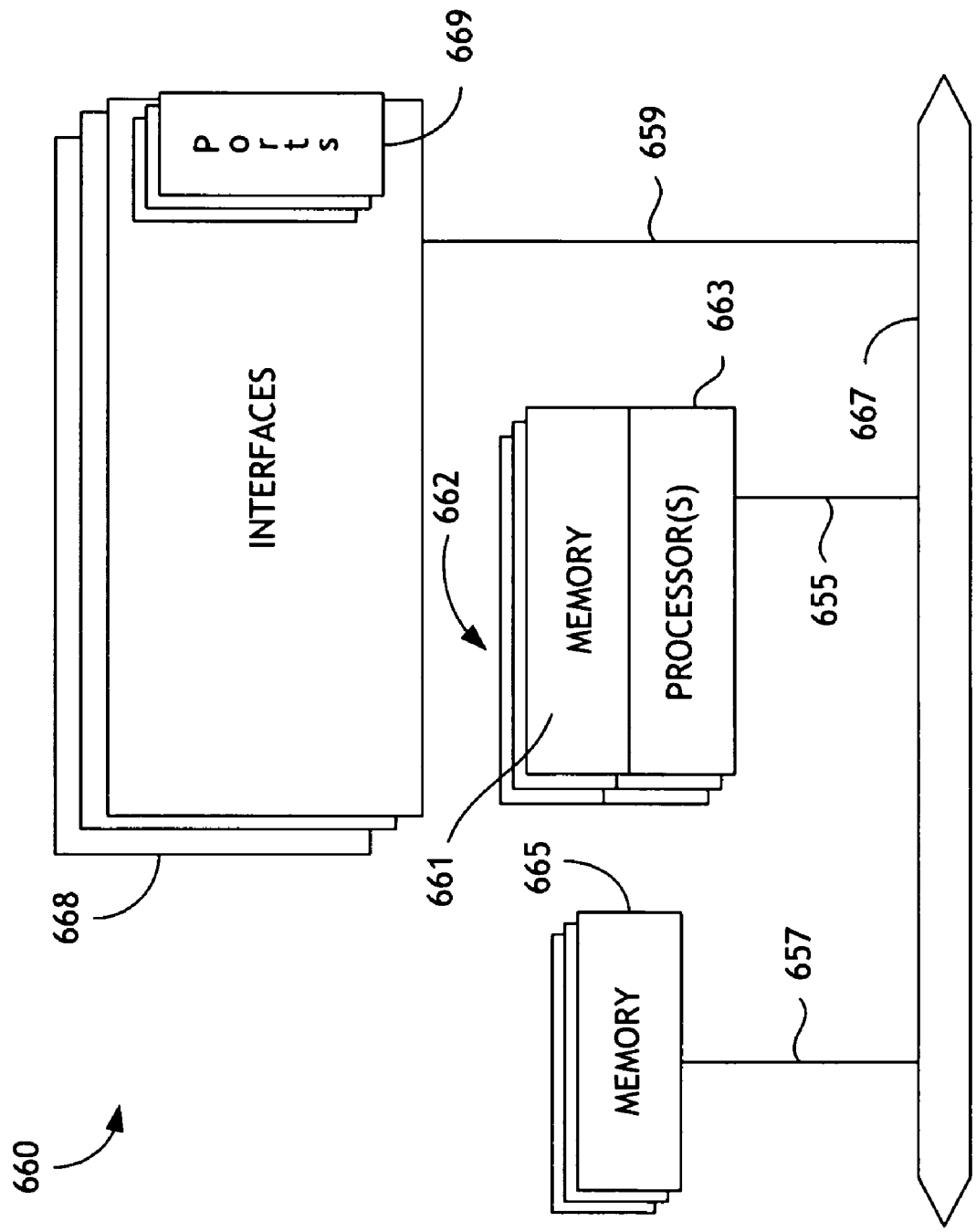
FIG. 6 is a block diagram of a data processing device such as a game server, constructed according to one embodiment of the present invention.

FIG. 6 illustrates an example of a network device that may be configured as a server or other data processing device for implementing some methods and apparatus of the present invention. Network device 660 includes a master central processing unit (CPU) 662, interfaces 668, and a bus 667 (e.g., a PCI bus). Generally, interfaces 668 include ports 669 appropriate for communication with the appropriate media. In some embodiments, one or more of interfaces 668 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 668 control such communications-intensive tasks as media control and management. By providing separate processors for the communications-intensive tasks, interfaces 668 allow the master microprocessor 662 efficiently to perform other functions such as routing computations, network diagnostics, security functions, etc.

The interfaces 668 are typically provided as network interface cards (sometimes referred to as "linecards"). Generally, interfaces 668 control the sending and receiving of data packets over the network and sometimes support other peripherals used with the network device 660. Among the interfaces that may be provided are FC interfaces, Ethernet interfaces, frame relay interfaces, cable interfaces, DSL interfaces, token ring interfaces, and the like. In addition, various high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 662 may be responsible for implementing specific functions associated with the functions of a desired network device. According to some embodiments, CPU 662 accomplishes all these functions under the control of software including an operating system and any appropriate applications software.

CPU 662 may include one or more processors 663 such as a processor from the Motorola family of microprocessors or the MIPS family of microprocessors. In an alternative embodiment, processor 663 is specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

Regardless of the network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 6 illustrates one specific data processing device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 6) or switch fabric based (such as a cross-bar).

A bus is generally a collection of connections through which the data is transmitted from one device to another. As used herein, "bus" can refer to an internal bus, through which data travels between chips or other components within the gaming machine, e.g., on a motherboard. Bus can also refer to an external bus through which the gaming machine or components within the gaming machine, e.g., on the motherboard, communicate with devices or other components external to the gaming machine. Buses often consist of two parts: an address bus and a data bus. The data bus transfers the actual data whereas the address bus transfers information about the destination of the data. The size of the bus, commonly known as its width, determines how much data can be transmitted at a time. For example, a 16-bit bus can transmit 16 bits of data, whereas a 32-bit bus can transmit 32 bits of data.

Figure 7:
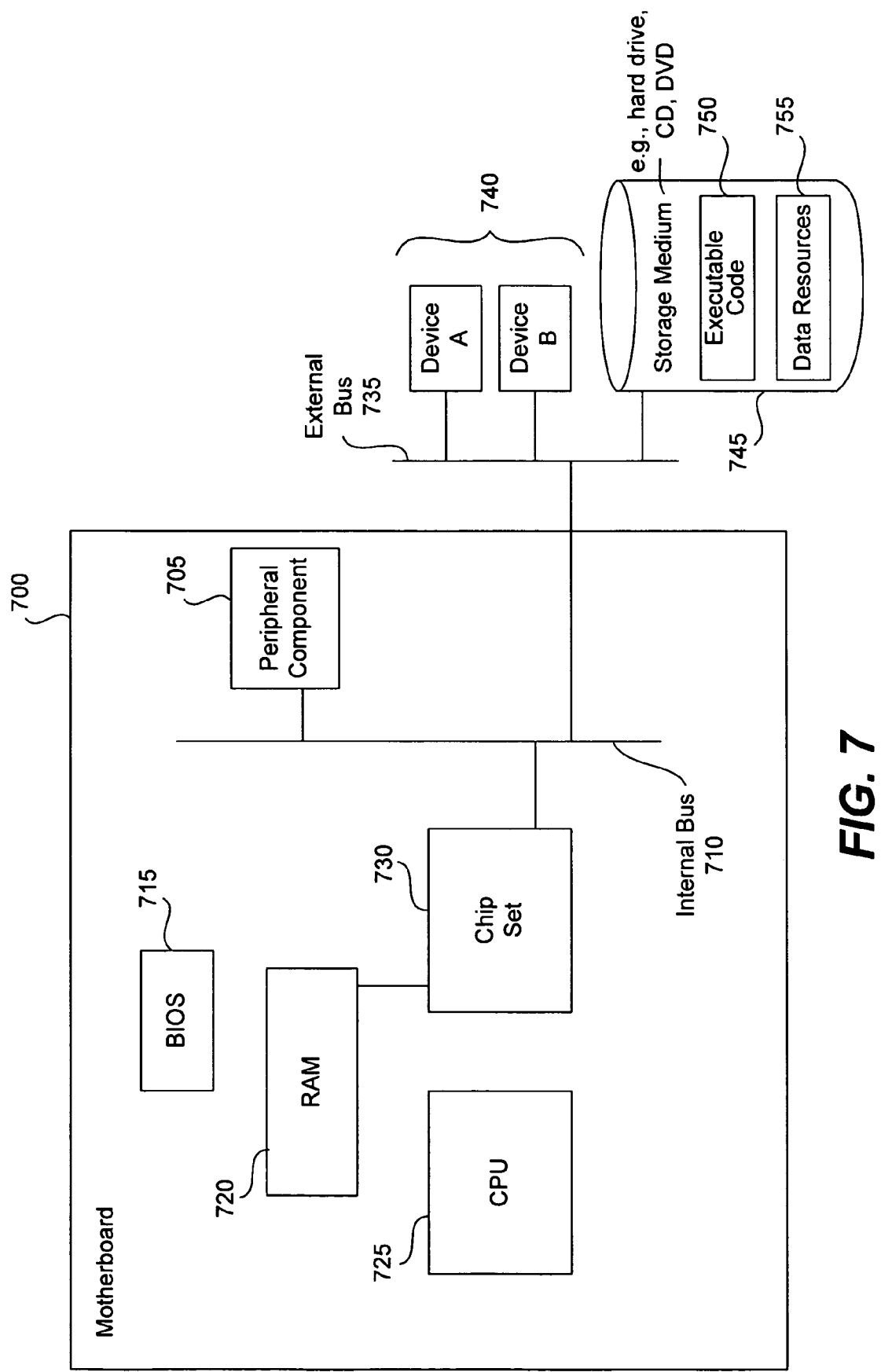
FIG. 7 shows a block diagram of a motherboard 700 having a peripheral component 705 coupled to the motherboard 700 over a bus 710 and located on the motherboard, according to one embodiment of the present invention.

FIG. 7 shows a block diagram of a motherboard 700 having a peripheral component 705 coupled to the motherboard 700 over a bus 710 and located, at least partially, on the motherboard 700. In this embodiment, motherboard 700 is a suitable off-the-shelf motherboard having standard motherboard components including BIOS 715, RAM 720, CPU 725 and a chip set 730. The peripheral component 705 is, in one embodiment, mounted or otherwise physically located on the motherboard 700, e.g., by insertion into a card slot. Internal bus 710 can be coupled to an external bus 735 having slots or interfaces to which additional devices 740 can be coupled. In addition, external bus 735 is coupled to a storage medium 745 such as a hard drive, CD or DVD. This storage medium 745 stores executable code 750 and data resources 755. As discussed in greater detail below, during bootup, the peripheral component 705 is activated to authenticate data 750 and 755 in storage medium 745 over the internal bus 710 and external bus 735.

Figure 8:
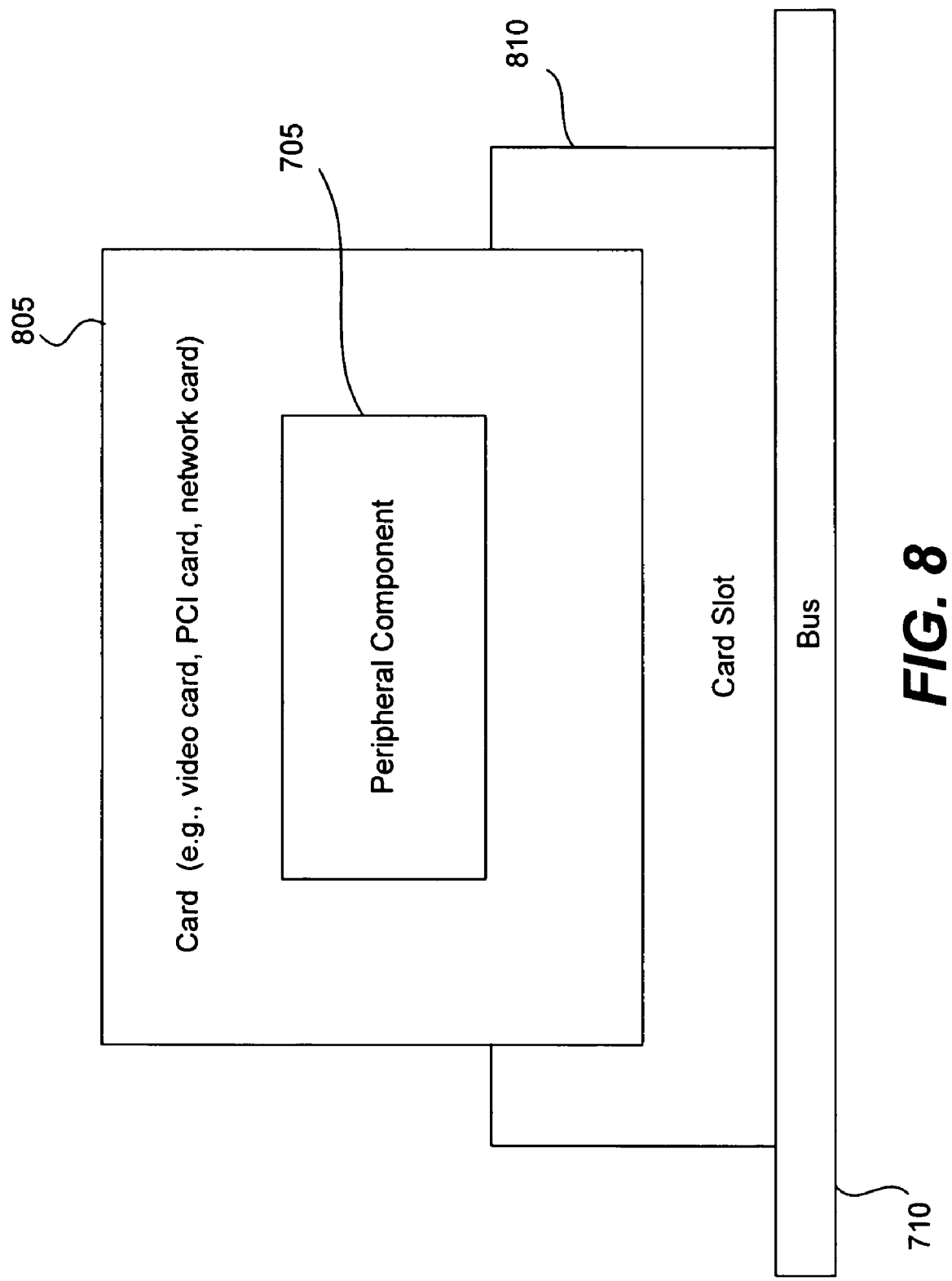
FIG. 8 shows a block diagram of a peripheral component 705 implemented on a card 805, constructed according to one embodiment of the present invention.

FIG. 8 shows a block diagram of one implementation of peripheral component 705 on a card 805. In this embodiment, the peripheral component is physically built onto a suitable card 805 which can be coupled to bus 710 or external bus 735 of FIG. 7, for example, by insertion into a card slot 810. Examples of card 805 include a video card capable of being inserted in internal bus 710 of FIG. 7, and a PCI card capable of being coupled to internal bus 710 or external bus 735. Another example of card 805 is a network card, such as a network interface card, which can be coupled to external bus 735 over a wireless and/or wired network as desired. Those skilled in the art will appreciate that peripheral component 705 can be situated on various cards and coupled to motherboard 700 over one or more buses or networks, as desired.

Figure 9:
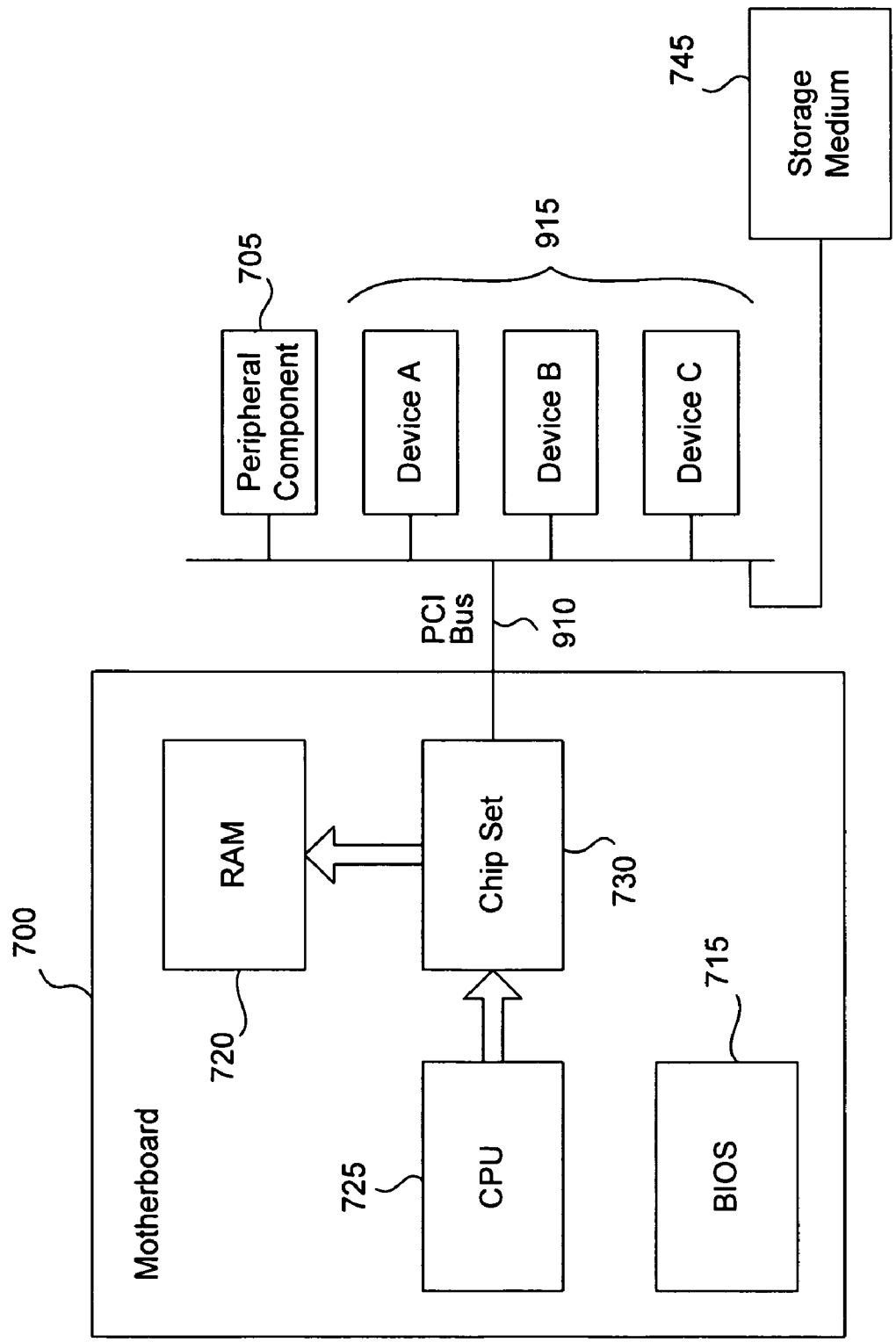
FIG. 9 shows a block diagram of motherboard 700 coupled to peripheral component 705 over a PCI bus 910, according to another embodiment of the present invention.

FIG. 9 shows a block diagram of motherboard 700 coupled to peripheral component 705 over a PCI bus 910, according to another embodiment of the present invention. In FIG. 9, peripheral component 705 is situated off of motherboard 700, unlike the arrangement of FIG. 7. In FIG. 9, while bus 910 is implemented as a PCI bus, those skilled in the art will appreciate that, in other embodiments, bus 910 is implemented as a USB bus, firewire, SATA, wireless or other wired bus. Such variations are contemplated within the scope of the present invention. In FIG. 9, the PCI bus 910 enables motherboard 700 to interact with various devices 915 coupled to PCI bus 910. Storage medium 745 is also coupled to PCI bus 910.

The peripheral component 705 can be constructed as a passive device or, alternatively, as an active device. For example, in one implementation of peripheral component 705 as a passive device, peripheral component 705 stores authentication code which performs an authentication process, for example, as described in U.S. Pat. Nos. 5,643,086 and 6,149,522. In one embodiment, responsive to an authentication instruction message, the peripheral component can provide the authentication code to the motherboard RAM 720, as shown in FIGS. 7 and 9, for execution by the motherboard CPU 725. In alternative implementation, i.e., when the peripheral component 705 is constructed as an active device, responsive to the authentication instruction message, peripheral component 705 executes the authentication code on a local CPU or other processor to perform the authentication process on the data in storage medium 745. In both instances, those skilled in the art will appreciate that the CPU or processor executing the authentication code is coupled to access data stored on storage medium 745, for example, over a suitable bus.

Figure 10:
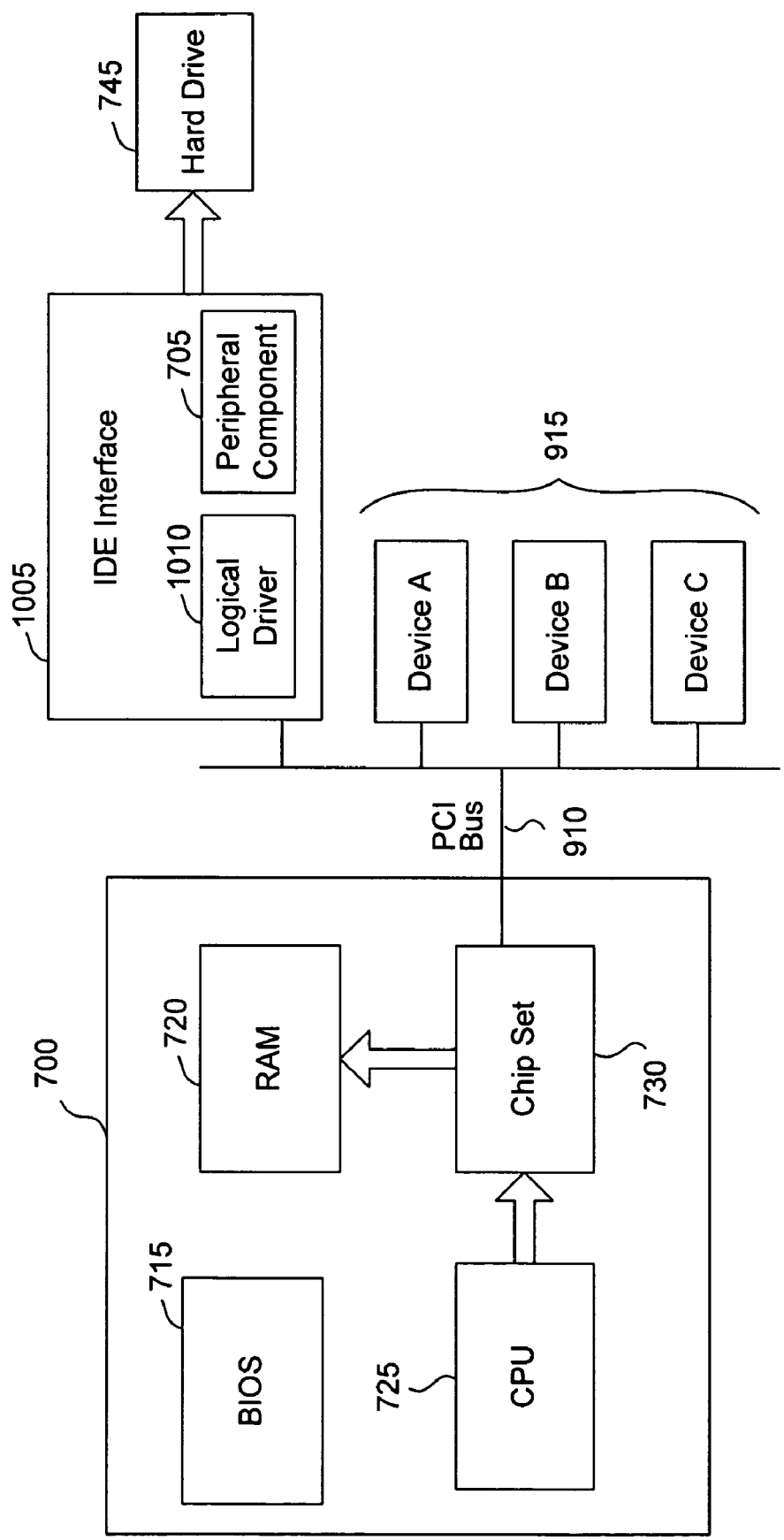
FIG. 10 shows a block diagram of motherboard 700 in communication with an IDE ("integrated drive electronics") interface, in which the peripheral component 705 is situated, according to another embodiment of the present invention.

FIG. 10 shows a block diagram of motherboard 700 in communication with an IDE ("integrated drive electronics") interface 1005, in which the peripheral component 705 is situated. The IDE interface 1005 is coupled to bus 910 as shown, and coupled directly to storage medium 745, in this example, a hard drive. The IDE interface 1005 includes standard driver circuitry implementing processes for operating the hard drive 745 and otherwise interacting with the hard drive using conventional techniques. In addition, the IDE interface 1005 includes a logical driver 1010 module which is separate from the conventional driver circuitry and functions of IDE interface 1005. The novel logical driver 1010 of IDE interface 1005 implements logical operations to access particular data, such as executable code 750 and data resources 755 stored on hard drive 745. The logical driver 1010 is coupled to locate files 750 and 755, interpret the data 750 and 755 as some structure, and verify the data.

Figure 11:
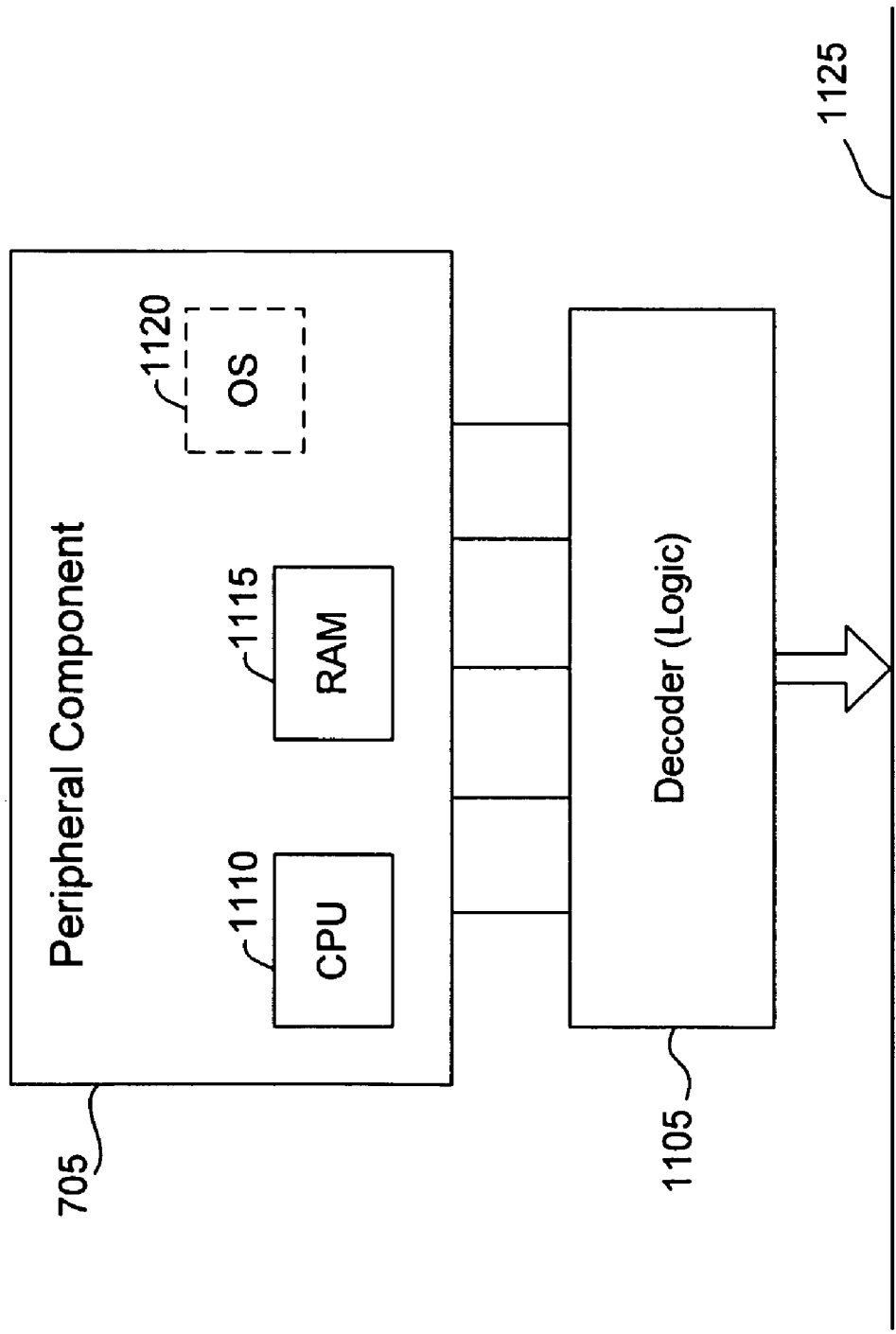
FIG. 11 shows a block diagram of peripheral component 705 in communication with a bus 1125, constructed in accordance with one embodiment of the present invention.

FIG. 11 shows a block diagram of peripheral component 705 in communication with a bus 1125, in accordance with one embodiment of the present invention. As shown, in one implementation, peripheral component 705 communicates with bus 1125 through a decoder 1105 coupled to decode information passed between peripheral component 705 and bus 1125, such as unique IDs and other information. In one embodiment, as shown in FIG. 11, peripheral component 705 is constructed as an active device, as mentioned above. In this embodiment, the peripheral component 705 is constructed to include its own processor, i.e. CPU 1110, a memory module, i.e. RAM 1115 and, in some implementations, its own operating system 1120 all built into peripheral component 705 or into the card or device on which peripheral component 705 is implemented. In this way, the peripheral component 705 can receive, store and execute authentication code to perform the authentication processes, all within peripheral component 705. In addition, in some implementations, peripheral component 705 is programmed to include any error handling processes when constructed as an active device.

In FIG. 11, those skilled in the art should appreciate that peripheral component 705 can also be used as a passive device, and also similarly be coupled to bus 735 through decoder 1105 as illustrated in FIG. 11. When peripheral component 705 is passive, in some implementations, authentication code stored in RAM 1115 is transferred from peripheral component 705 to motherboard 700 or another device and executed on a suitable processor to perform the desired authentication processes.

Figure 12:
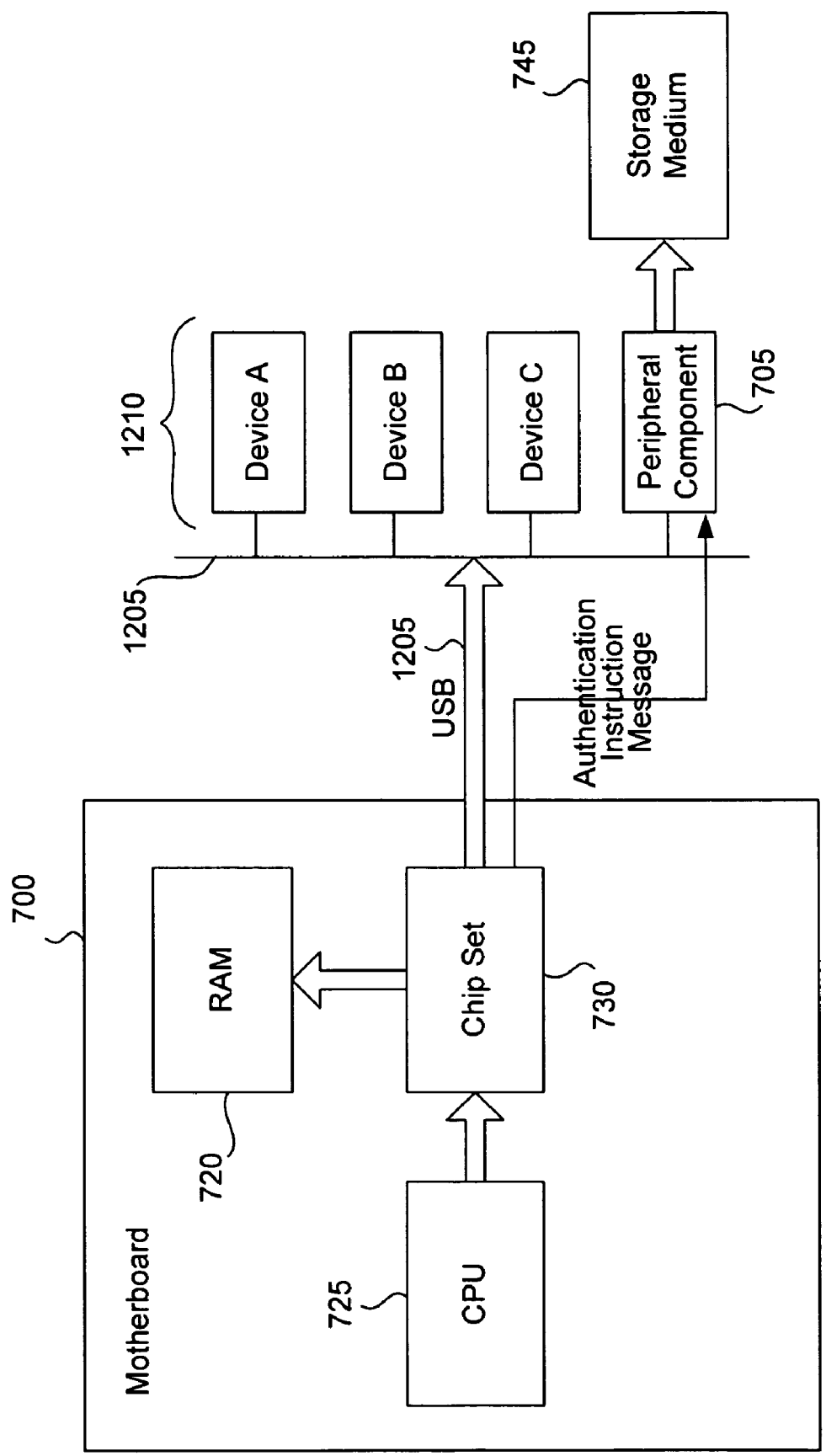
FIG. 12 shows a block diagram of an alternative arrangement of motherboard 700 and peripheral component 705, constructed according to one embodiment of the present invention.

FIG. 12 shows a block diagram of another arrangement of motherboard 700 and peripheral component 705, constructed according to another embodiment of the present invention. In FIG. 12, bus 1205 is implemented as a USB bus. In this embodiment, peripheral component 705 is one of a plurality devices 1210 coupled to USB bus 1205 as shown. Peripheral component 705 is coupled directly to storage medium 745 as shown.

Figure 13:
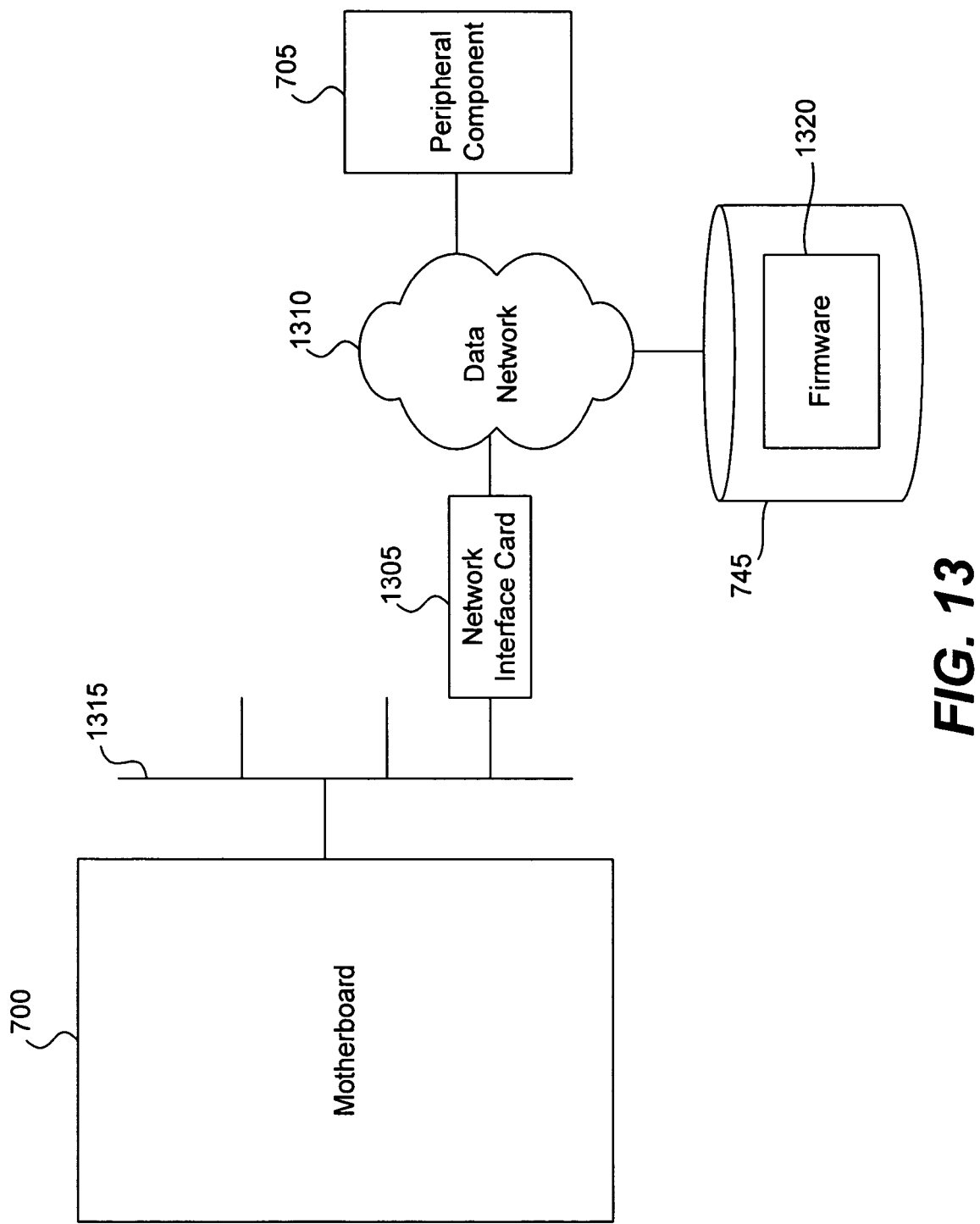
FIG. 13 shows a block diagram of an alternative arrangement of motherboard 700 and peripheral component 705, constructed according to another embodiment of the present invention.

FIG. 13 shows an alternative arrangement of motherboard 700 and peripheral component 705, constructed according to another embodiment of the present invention. In this embodiment, peripheral component 705 is implemented as a network device coupled to a suitable data network 1310. Those skilled in the art will appreciate that data network 1310 can be any suitable wired network, wireless network, or combination thereof enabling communications between the motherboard 700, through bus 1315, and other devices such peripheral component 705 coupled to data network 1310. In FIG. 13, a network interface card 1305 is coupled between bus 1315 associated with motherboard 700 and data network 1310, facilitating communications between motherboard 700 and data network 1310. Those skilled in the art will appreciate that peripheral component 705 itself can be implemented as a network interface card coupled to data network 1310. In FIG. 13, storage medium 745 stores firmware 1320 which can be authenticated using the same authentication processes described herein.

Figure 14:
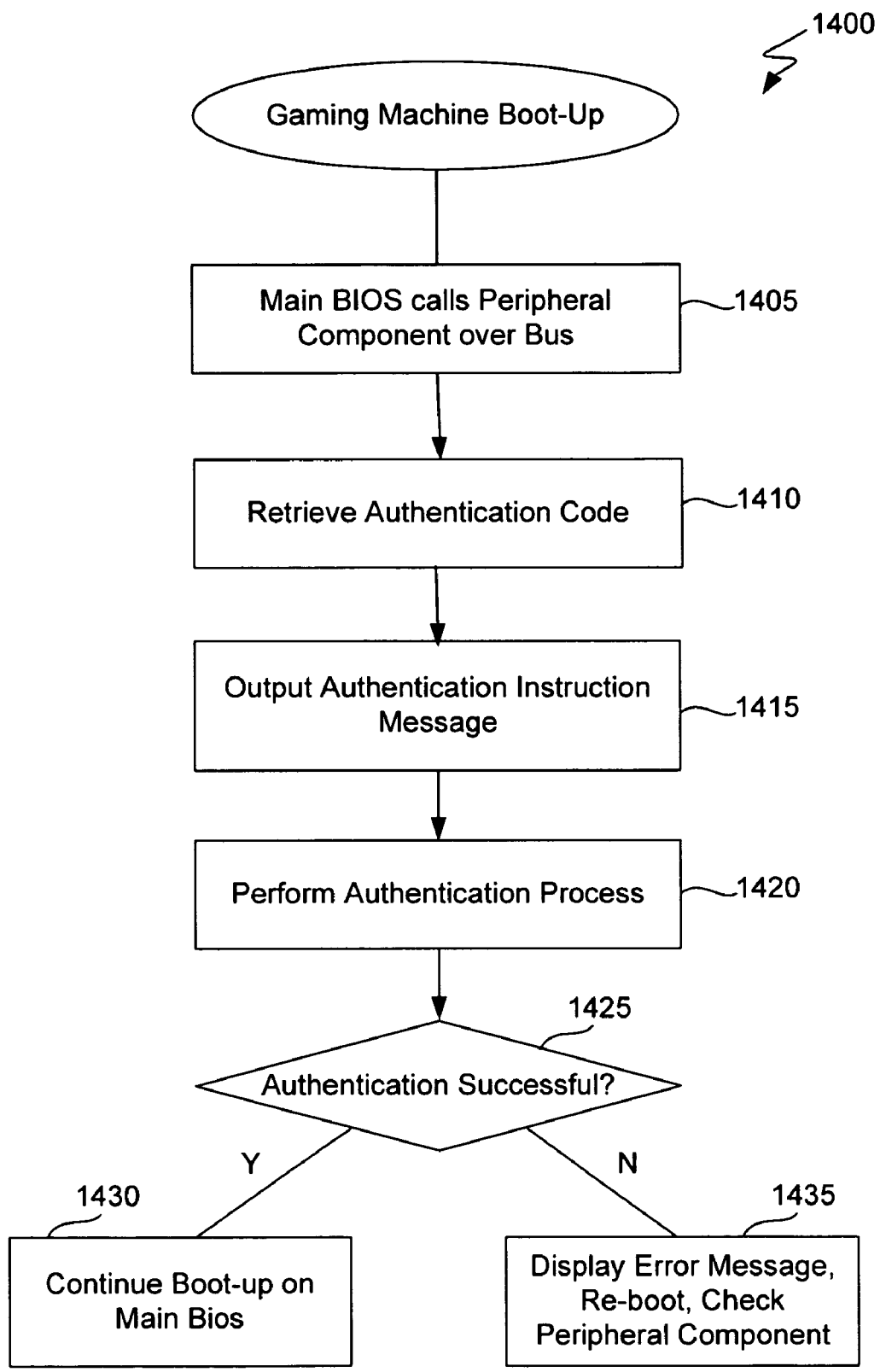
FIG. 14 shows a flow diagram of an authentication method 1400 in the context of a gaming machine boot-up operation, performed in accordance with one embodiment of the present invention.
Figure 15:
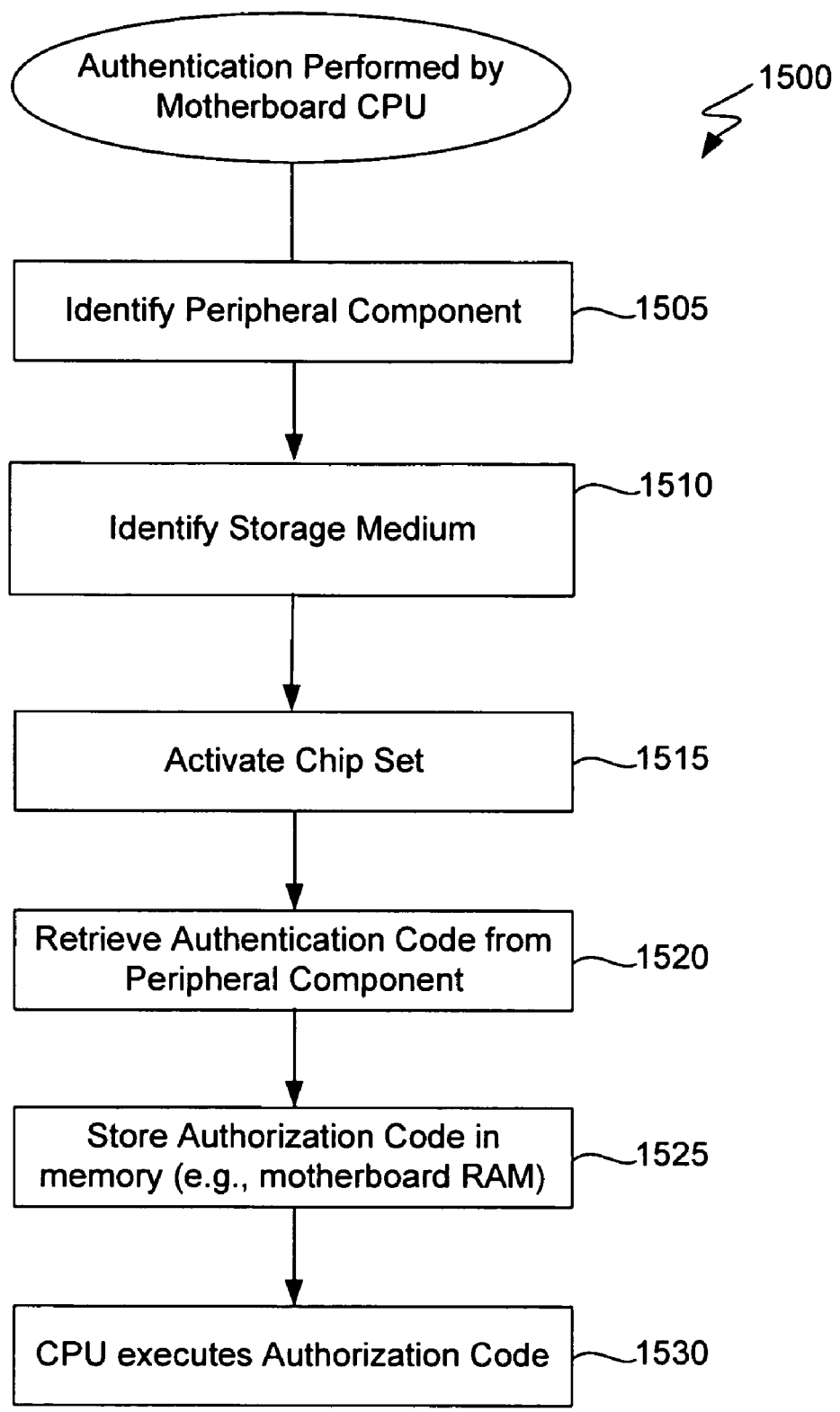
FIG. 15 shows a flow diagram of an authentication method 1500, performed in accordance with one embodiment of the present invention.
Figure 16:
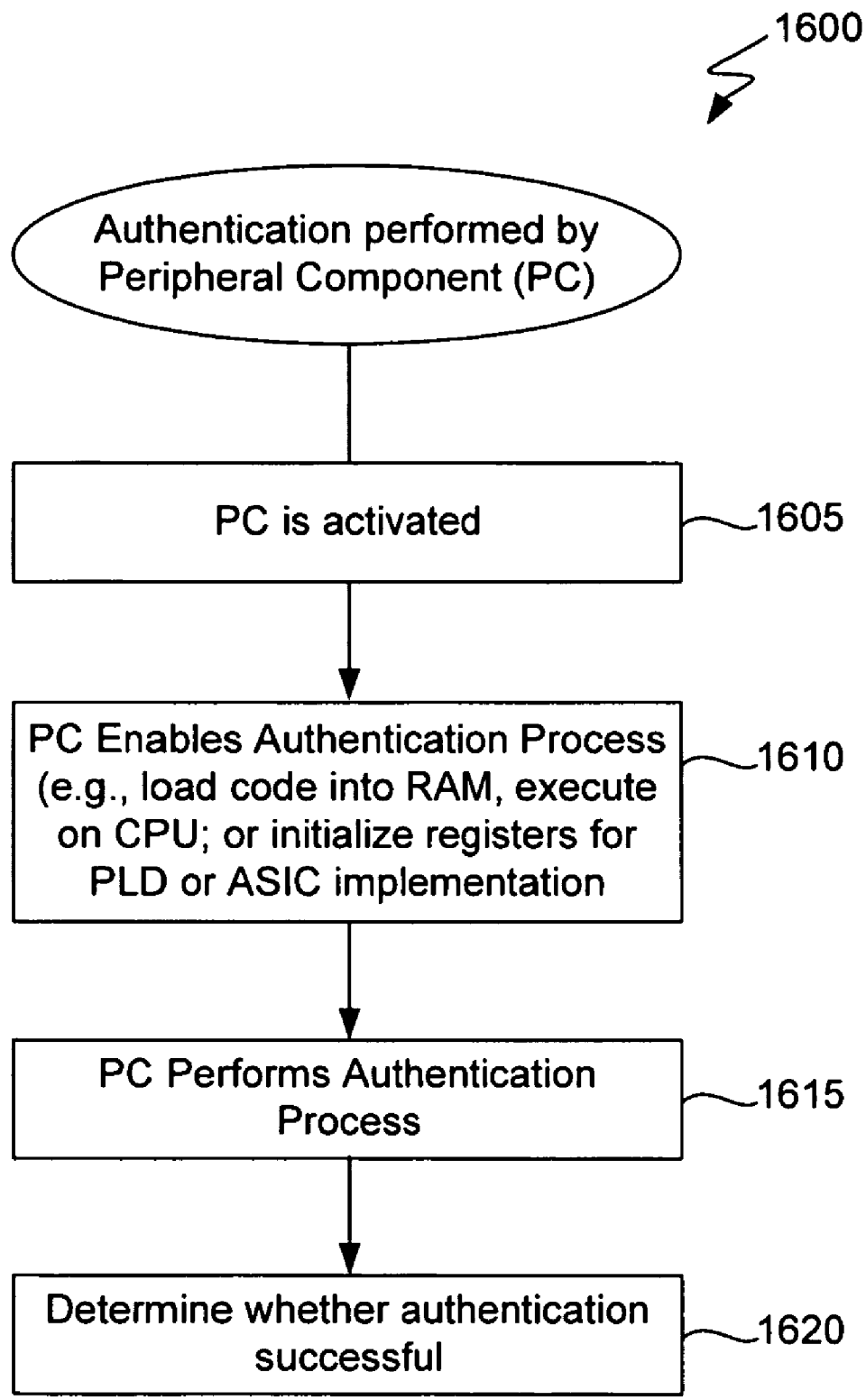
FIG. 16 shows a flow diagram of an authentication method 1600, performed in accordance with one embodiment of the present invention.

FIGS. 14-16 show flow diagrams of authentication methods 1400, 1500 and 1600 performed in accordance with embodiments of the present invention. FIGS. 14-16 are applicable to all of the various motherboard and peripheral component arrangements described above and illustrated in FIGS. 7-13.

In FIG. 14, in step 1405, during a gaming machine boot-up operation, the main BIOS 715 calls the peripheral component 705 over one or more buses and, in the embodiment of FIG. 14, data network. In step 1410, authentication code for performing the authentication process is retrieved from memory for execution. In some embodiments, in which the peripheral component 705 is constructed as an active device, the peripheral component 705 retrieves the authentication code from a RAM or other suitable memory within or otherwise accessible to peripheral component 705, and loads the authentication code into a processor located on the peripheral component for execution. In an alternative embodiment, in which the peripheral component 705 is passive, the motherboard 700 retrieves the authentication code from the peripheral component 705 and stores the authentication code on RAM 720 or other suitable memory for execution by CPU 725 of motherboard 700.

In step 1415, an authentication instruction message is generated to initiate the authentication process. When the peripheral component is a passive device, this authentication instruction message can be provided to CPU 725 of motherboard 700 to instruct CPU 725 to perform the authentication process. In an alternative embodiment, when the peripheral component is an active device, the BIOS 715 or CPU 725 of motherboard can generate the authentication instruction message and output the message to the peripheral component 705 to initiate the authentication process.

In step 1420, responsive to the authentication instruction message of step 1415, the authentication code is executed to perform the authentication process or processes on the data in storage medium 745. For example, the authentication code can be constructed so as to execute one or more of the authentication processes described in Alcorn et al., U.S. Pat. Nos. 5,643,086 and 6,149,522. In step 1425, following step 1420, it is determined whether the authentication process was successful in authenticating the contents of storage medium 745. When the authentication process is successful, in step 1430, the boot up process is allowed to continue on the main BIOS 715. On the other hand, in step 1425, when the authentication process is unsuccessful, the method 1400 proceeds to step 1435 in which an error message is generated and output for display. In addition, in step 1435, the BIOS can be instructed to re-boot the gaming machine and/or send a message instructing casino personnel to check the peripheral component 705 for malfunction or tampering.

FIG. 15 shows a flow diagram of an authentication method 1500 performed by the motherboard CPU 725 in an arrangement where the authentication code is retrieved from peripheral component 705 for execution on motherboard 700. In step 1505, the BIOS 715 on motherboard 700 identifies peripheral component 705 on the bus and/or network, depending on the implementation. In step 1510, the BIOS 715 or CPU 725 also identifies the storage medium 745 on the bus and/or network.

In step 1515, following step 1510, the BIOS 715 or CPU 725 of motherboard 700 activates the chip set 730 to enable communications with the peripheral component 705 and storage medium 745. In step 1520, following step 1515, the BIOS 715 and/or CPU 725 initiate a retrieve operation to retrieve the authentication code from the peripheral component 705. When the authentication code is received at the motherboard 700 from peripheral component 705, e.g., over a bus, the authentication code is stored in RAM 720 or other suitable memory on the motherboard 700, in step 1525. Then, in step 1530, the CPU 725 of motherboard 700 can execute the authentication code to perform the authentication processes such as those described in Alcorn et al., U.S. Pat. Nos. 5,643,086 and 6,149,522.

FIG. 16 shows an authentication method 1600 performed by the peripheral component 705, in an arrangement where the peripheral component is an active device. In step 1605, the peripheral component 705 is activated, by independent power-up or responsive to an authentication instruction message sent from motherboard 700 or another device coupled to the bus or network. In step 1610, following activation, the peripheral component 705 enables the authentication process. For example, this enabling operation can include loading the authentication code into RAM 1115 on the peripheral component 705, execution by the CPU 1110 on peripheral component 705, and/or initiation of registers on the peripheral component 705 in implementations where the active peripheral component is constructed as a programmable logic device ("PLD") or application specific integration circuit ("ASIC").

In step 1615, following step 1610, the peripheral component 705 executes the authentication code to perform the authentication process. Then, as described above with respect to step 1425 of FIG. 14, in step 1620, it is determined whether the authentication process was successful. In one embodiment, following step 1620, when the authentication process is successful, a signal is output by the processor of the peripheral component 705 indicating that boot-up and game play on the gaming machine is to be allowed. When this output signal is received and interpreted by the master gaming controller of the gaming machine, the controller enable game play on the machine. By the same token, when the authentication process is unsuccessful in step 1620, the signal outputted by the processor of the peripheral component 705 indicates that game play on the machine should be disabled. The master gaming controller receives and interprets the signal, and disables game play, accordingly.

While the invention has been particularly shown and described with reference to specific embodiments thereof, it will be understood by those skilled in the art that changes in the form and details of the disclosed embodiments may be made without departing from the spirit or scope of the invention. It should also be understood that, for example, the exemplary embodiment of FIGS. 14, 15 and 16 are merely presented for illustrative purposes and that not all of the process elements described must be practiced to be within the scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for authenticating data for playing a game of chance on a state-based gaming machine, the method comprising:

providing a state-based gaming machine adapted to receive a wager from a player for play of a game of chance and output an award responsive to play of the game of chance, the state-based gaming machine adapted to maintain gaming machine state information in a non-volatile memory, the gaming machine state information capable of including award information related to outputting the award responsive to play of the game of chance;

providing a motherboard in the gaming machine, the motherboard including a BIOS adapted to control a boot-up operation of the gaming machine, the boot-up operation including restoration of a state of the gaming machine prior to a power on or reset of the gaming machine in accordance with the gaming machine state information stored in the non-volatile memory;

providing a peripheral component in communication with the motherboard over a bus, the peripheral component having access to authentication code in a memory, the peripheral component being removably coupled with the bus;

receiving, at the peripheral component, an authentication instruction message over the bus, the authentication instruction message provided as a part of the boot-up operation, the authentication instruction message including an indication to initiate execution of the authentication code;

executing, responsive to receiving the authentication instruction message, the authentication code on a processor to perform an authentication process to verify the authenticity of the data, the data being stored in a storage medium located external to the peripheral component, the storage medium being accessible to the state-based gaming machine; and outputting a signal indicating whether the authentication process is successful in authenticating the data.

2. The method of claim 1, wherein at least a portion of the bus is situated within the gaming machine.

3. The method of claim 1, wherein at least a portion of the bus is situated outside of the gaming machine.

4. The method of claim 1, wherein the peripheral component is situated on the motherboard.

5. The method of claim 1, wherein the peripheral component is situated off of the motherboard.

6. The method of claim 1, wherein the bus has a protocol selected from the group consisting of PCI, USB, Firewire, and SATA.

7. The method of claim 1, wherein the peripheral component is situated on a card.

8. The method of claim 7, wherein the card is one selected from the group consisting of a video card, a PCI card, and a network card.

9. The method of claim 1, wherein the peripheral component is situated in an IDE interface.

10. The method of claim 9, wherein the storage medium is coupled directly to the IDE interface.

11. The method of claim 9, wherein the IDE interface includes a logical driver configured to access the storage medium.

12. The method of claim 1, wherein the storage medium is coupled to the bus, and the processor is in communication with the storage medium over the bus.

13. The method of claim 1, wherein a BIOS on the motherboard generates the authentication instruction message.

14. The method of claim 1, wherein the processor is located on the motherboard.

15. The method of claim 14, further comprising:
retrieving the authentication code through the peripheral component; and
storing the authentication code on a memory coupled to the processor.

16. The method of claim 1, wherein the processor is located on the peripheral component.

17. The method of claim 1, wherein the outputted signal is configured to:
i) enable play of the game of chance on the gaming machine when the authentication process is successful, and
ii) disable play of the game of chance on the gaming machine when the authentication process is unsuccessful.

18. A peripheral component for authenticating data for playing a game of chance on a state-based gaming machine, the peripheral component in communication with a storage medium storing the data, the peripheral component comprising:
a communications interface for communication with a motherboard in the gaming machine over a bus, the peripheral component being removably coupled with the bus,
a memory storing authentication code;
a processor coupled to the memory and capable of:
i) loading the authentication code from the memory,
ii) executing the authentication code, responsive to receiving an authentication instruction message from the motherboard over the bus, to perform an authentication process to verify the authenticity of the data in the storage medium, the storage medium located external to the peripheral component, the storage medium being accessible to the state-based gaming machine, the authentication instruction message including an indication to initiate execution of the authentication code, the authentication instruction message provided as a part of a boot-up operation of a state-based gaming machine adapted to receive a wager from a player for play of a game of chance and output an award responsive to play of the game of chance, the state-based gaming machine adapted to maintain gaming machine state information in a non-volatile memory, the gaming machine state information capable of including award information related to outputting the award responsive to play of the game of chance, the boot-up operation controlled by a BIOS of the motherboard, the boot-up operation including restoration of a state of the gaming machine prior to a power on or reset of the gaming machine in accordance with the gaming machine state information stored in the non-volatile memory, and
iii) outputting a signal indicating whether the authentication process is successful in authenticating the data.

19. The peripheral component of claim 18, wherein a decoder is coupled between the peripheral component and the bus.

20. The peripheral component of claim 18, the peripheral component further comprising:
an operating system controlling the processor.

21. The peripheral component of claim 18, wherein the peripheral component is situated on the motherboard.

22. The peripheral component of claim 18, wherein the peripheral component is situated off of the motherboard.

23. The peripheral component of claim 18, wherein the peripheral component is situated on a card.

24. The peripheral component of claim 18, wherein the peripheral component is situated in an IDE interface.

25. The peripheral component of claim 18, wherein a BIOS on the motherboard generates the authentication instruction message.

26. The peripheral component of claim 18, wherein the outputted signal is configured to:

i) enable play of the game of chance on the gaming machine when the authentication process is successful, and ii) disable play of the game of chance on the gaming machine when the authentication process is unsuccessful.

27. A state-based gaming machine capable of authenticating data for playing a game of chance, the gaming machine comprising:

a motherboard in communication with a bus, the motherboard including a BIOS adapted to control a boot-up operation of a state-based gaming machine adapted to receive a wager from a player for play of a game of chance and output an award responsive to play of the game of chance, the state-based gaming machine adapted to maintain gaming machine state information in a non-volatile memory, the gaming machine state information capable of including award information related to outputting the award responsive to play of the game of chance, the boot-up operation including restoration of a state of the gaming machine prior to a power on or reset of the gaming machine in accordance with the gaming machine state information stored in the non-volatile memory;

a peripheral component in communication with the motherboard over the bus, the peripheral component in communication with a storage medium storing the data, the storage medium located external to the peripheral component, the storage medium being accessible to the state-based gaming machine, the peripheral component having a memory storing authentication code, the peripheral component being removably coupled with the bus;

a processor in communication with the memory and capable of:

i) retrieving, from the peripheral component, the authentication code from the memory, ii) executing the authentication code, responsive to receiving an authentication instruction message over the bus, to perform an authentication process to verify the authenticity of the data in the storage medium, the authentication instruction message including an indication to initiate execution of the authentication code, the authentication instruction message provided as a part of a boot-up operation of a state-based gaming machine adapted to receive a wager from a player for play of a game of chance and output an award responsive to play of the game of chance, the boot-up operation controlled by a BIOS of the motherboard, the boot-up operation including restoration of a state of the gaming machine prior to a power on or reset of the gaming machine, and iii) outputting a signal indicating whether the authentication process is successful in authenticating the data.

28. The gaming machine of claim 27, wherein at least a portion of the bus is situated within the gaming machine.

29. The gaming machine of claim 27, wherein at least a portion of the bus is situated outside of the gaming machine.

30. The gaming machine of claim 27, wherein the peripheral component is situated on the motherboard.

31. The gaming machine of claim 27, wherein the peripheral component is situated off of the motherboard.

32. The gaming machine of claim 27, wherein the bus has a protocol selected from the group consisting of PCI, USB, Firewire, and SATA.

33. The gaming machine of claim 27, wherein the peripheral component is situated on a card.

34. The gaming machine of claim 33, wherein the card is one selected from the group consisting of a video card, a PCI card, and a network card.

35. The gaming machine of claim 27, wherein the peripheral component is situated in an IDE interface.

36. The gaming machine of claim 35, wherein the IDE interface includes a logical driver configured to access the storage medium.

37. The gaming machine of claim 27, wherein the storage medium is coupled to the bus, and the processor is in communication with the storage medium over the bus.

38. The gaming machine of claim 27, wherein a BIOS on the motherboard generates the authentication instruction message.

39. The gaming machine of claim 27, wherein the processor is located on the motherboard.

40. The gaming machine of claim 27, wherein the processor is located on the peripheral component.

41. The gaming machine of claim 27, wherein the outputted signal is configured to:

i) enable play of the game of chance on the gaming machine when the authentication process is successful, and ii) disable play of the game of chance on the gaming machine when the authentication process is unsuccessful.

42. A method for authenticating data for playing a game of chance on a state-based gaming machine, the method comprising:

providing a state-based gaming machine adapted to receive a wager from a player for play of a game of chance and output an award responsive to play of the game of chance, the state-based gaming machine adapted to maintain gaming machine state information in a non-volatile memory, the gaming machine state information capable of including award information related to outputting the award responsive to play of the game of chance;

providing a motherboard in the gaming machine, the motherboard including a BIOS adapted to control a boot-up operation of the gaming machine, the boot-up operation including restoration of a state of the gaming machine prior to a power on or reset of the gaming machine in accordance with the gaming machine state information stored in the non-volatile memory;

providing a peripheral component in communication with the motherboard over a bus, the peripheral component having access to authentication code in a memory, the peripheral component being removably coupled with the bus;

receiving, at the peripheral component, an authentication instruction message over the bus, the authentication instruction message provided as a part of the boot-up operation, the authentication instruction message including an indication to initiate execution of the authentication code;

executing, at the peripheral component and responsive to receiving the authentication instruction message, the authentication code on a processor to perform an authentication process to verify the authenticity of the data, the data being stored in a storage medium, the storage medium being accessible to the state-based gaming machine; and outputting a signal indicating whether the authentication process is successful in authenticating the data.

* * * * *